United States Patent
Harada et al.

(10) Patent No.: US 10,370,548 B2
(45) Date of Patent: Aug. 6, 2019

(54) COPOLYMER, INK INCLUDING COPOLYMER, AND INK-STORED CONTAINER

(71) Applicants: Shigeyuki Harada, Shizuoka (JP); Akihiko Matsuyama, Shizuoka (JP); Yoshiki Yanagawa, Shizuoka (JP); Masayuki Fukuoka, Shizuoka (JP); Takuya Yamazaki, Shizuoka (JP); Kazukiyo Nagai, Shizuoka (JP); Yuusuke Koizuka, Shizuoka (JP); Tomoyuki Shimada, Shizuoka (JP); Akiyoshi Sabu, Shizuoka (JP)

(72) Inventors: Shigeyuki Harada, Shizuoka (JP); Akihiko Matsuyama, Shizuoka (JP); Yoshiki Yanagawa, Shizuoka (JP); Masayuki Fukuoka, Shizuoka (JP); Takuya Yamazaki, Shizuoka (JP); Kazukiyo Nagai, Shizuoka (JP); Yuusuke Koizuka, Shizuoka (JP); Tomoyuki Shimada, Shizuoka (JP); Akiyoshi Sabu, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/704,834

(22) Filed: Sep. 14, 2017

(65) Prior Publication Data
US 2018/0002553 A1    Jan. 4, 2018

Related U.S. Application Data

(63) Continuation of application No. PCT/JP2016/057802, filed on Mar. 11, 2016.

(30) Foreign Application Priority Data

Mar. 19, 2015 (JP) .................................. 2015-055984

(51) Int. Cl.
*B41J 2/17* (2006.01)
*C09D 11/107* (2014.01)
(Continued)

(52) U.S. Cl.
CPC ......... *C09D 11/107* (2013.01); *B41J 2/17503* (2013.01); *C08F 220/36* (2013.01);
(Continued)

(58) Field of Classification Search
None
See application file for complete search history.

(56) References Cited

U.S. PATENT DOCUMENTS 6,244,701 B1 * 6/2001 Moriya .................... B41M 5/52
347/105
8,960,885 B2    2/2015 Katoh et al.
(Continued)

FOREIGN PATENT DOCUMENTS

CN         104046133 B      8/2016
EP         1 767 600 A2     3/2007
(Continued)

OTHER PUBLICATIONS

Extended European Search Report dated Jan. 5, 2018 in European Patent Application No. 16764899.7 citing documents AA, AO and AP therein, 5 pages.
(Continued)

*Primary Examiner* — Erica S Lin
(74) *Attorney, Agent, or Firm* — Oblon, McClelland, Maier & Neustadt, L.L.P.

(57) ABSTRACT

A copolymer including a structural unit represented by General Formula (1) below, and a structural unit represented by General Formula (2) below,
(Continued)

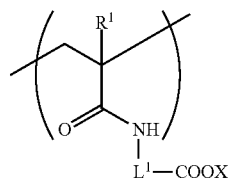

General Formula (1)

where, in General Formula (1), $R^1$ is a hydrogen atom or a methyl group, $L^1$ is an alkylene group having 2 or greater carbon atoms but 5 or less carbon atoms, and X is a hydrogen atom or a cation,

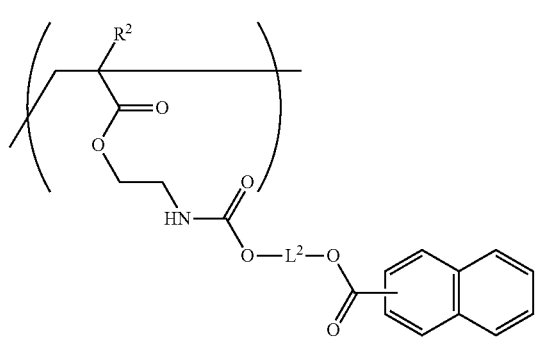

General Formula (2)

where, in General Formula (2), $R^2$ is a hydrogen atom or a methyl group and $L^2$ is an alkylene group having 2 or greater carbon atoms but 18 or less carbon atoms.

8 Claims, 3 Drawing Sheets

(51) Int. Cl.
| | | |
|---|---|---|
| *C08F 220/36* | (2006.01) | |
| *C08F 220/58* | (2006.01) | |
| *C09D 11/326* | (2014.01) | |
| *B41J 2/175* | (2006.01) | |
| *C09D 11/033* | (2014.01) | |
| *C09D 11/322* | (2014.01) | |
| *C08F 220/34* | (2006.01) | |

(52) U.S. Cl.
CPC .......... *C08F 220/58* (2013.01); *C09D 11/033* (2013.01); *C09D 11/322* (2013.01); *C09D 11/326* (2013.01); *C08F 2220/346* (2013.01); *C08F 2220/365* (2013.01)

(56) References Cited

U.S. PATENT DOCUMENTS

| | | |
|---|---|---|
| 8,974,895 B2 | 3/2015 | Naruse et al. |
| 8,998,400 B2 | 4/2015 | Harada et al. |
| 9,034,091 B2 | 5/2015 | Matsuyama et al. |
| 2005/0206703 A1 | 9/2005 | Guo et al. |
| 2005/0249925 A1 | 11/2005 | Ikegami et al. |
| 2006/0226401 A1 | 10/2006 | Xiao et al. |
| 2007/0071953 A1 | 3/2007 | Nakamura |
| 2007/0100023 A1 | 5/2007 | Burns et al. |
| 2007/0100024 A1 | 5/2007 | Gu et al. |
| 2009/0131577 A1 | 5/2009 | Kato et al. |
| 2011/0077349 A1* | 3/2011 | Hoshino ............... C08F 220/18 524/544 |
| 2014/0055520 A1 | 2/2014 | Inumaru et al. |
| 2014/0072779 A1 | 3/2014 | Matsuyama et al. |
| 2014/0120331 A1 | 5/2014 | Koizuka et al. |
| 2014/0141209 A1 | 5/2014 | Koizuka et al. |
| 2014/0267516 A1 | 9/2014 | Nonogaki et al. |
| 2015/0056425 A1 | 2/2015 | Nagai et al. |
| 2015/0064418 A1 | 3/2015 | Matsuyama et al. |
| 2015/0064425 A1 | 3/2015 | Matsuyama et al. |
| 2015/0109382 A1 | 4/2015 | Naruse et al. |
| 2015/0116421 A1 | 4/2015 | Nonogaki et al. |
| 2015/0125672 A1 | 5/2015 | Katoh et al. |
| 2015/0247049 A1 | 9/2015 | Matsuyama et al. |
| 2015/0252203 A1 | 9/2015 | Matsuyama et al. |
| 2015/0259555 A1 | 9/2015 | Katoh et al. |
| 2015/0291817 A1 | 10/2015 | Katoh et al. |
| 2015/0307734 A1 | 10/2015 | Nonogaki et al. |
| 2016/0017075 A1 | 1/2016 | Harada et al. |
| 2016/0075880 A1 | 3/2016 | Gu et al. |

FOREIGN PATENT DOCUMENTS

| | | |
|---|---|---|
| EP | 2 754 679 A1 | 7/2014 |
| EP | 2975093 A1 | 1/2016 |
| JP | 2867491 | 12/1998 |
| JP | 2005-344105 | 12/2005 |
| JP | 2007-186604 | 7/2007 |
| JP | 2008-535849 | 9/2008 |
| JP | 2008-536963 | 9/2008 |
| JP | 2009-299005 | 12/2009 |
| JP | 4687110 | 2/2011 |
| JP | 2011-042737 | 3/2011 |
| JP | 4722462 | 4/2011 |
| JP | 2011-105866 | 6/2011 |
| JP | 2012-052027 | 3/2012 |
| JP | 4956666 | 3/2012 |
| JP | 5001291 | 5/2012 |
| JP | 2014-047301 | 3/2014 |
| JP | 2016-196621 | 11/2016 |

OTHER PUBLICATIONS

International Search Report dated Jun. 7, 2016 for counterpart International Patent Application No. PCT/JP2016/057802 filed Mar. 11, 2016 (with English Translation).

Written Opinion dated Jun. 7, 2016 in PCT/JP2016/057802 filed Mar. 11, 2016.

Office Action dated Jan. 24, 2019 issued in corresponding Chinese patent application 201680016299.7 (with English translation).

* cited by examiner

COPOLYMER, INK INCLUDING COPOLYMER, AND INK-STORED CONTAINER

CROSS-REFERENCE TO RELATED APPLICATIONS

The present application is a continuation application of International Application No. PCT/JP2016/057802, filed Mar. 11, 2016, which claims priority to Japanese Patent Application No. 2015-055984, filed Mar. 19, 2015. The contents of these applications are incorporated herein by reference in their entirety.

BACKGROUND OF THE INVENTION

Field of the Invention

The present disclosure relates to a copolymer, and an ink including the copolymer and an ink-stored container.

Description of the Related Art

Compared with other printing systems, inkjet printing systems have simple processes, can easily realize full-color image formation, and can provide high-resolution images even with apparatuses having simple configurations. Therefore, the inkjet printing systems are widely used, and applications of the inkjet printing systems have been sifted from only personal use to use in offices, and fields of commercial printing and industrial printing.

As a printing medium for inkjet printing of office use, plain paper is typically used, and a high image density is desired in the inkjet printing of office use. When a pigment ink is printed on plain paper, generally, a surface of the plain paper is swollen with water contained in the pigment ink just after the pigment ink is landed and deposited on the plain paper, and therefore a difference in a stretching rate between the surface and a back surface of the plain paper becomes large to cause curl. The above-described phenomenon is resolved as the ink is dried and therefore it is not a problem in low-speed printing. When a printing speed is increased, plain paper needs to be transported without resolving the curl. Therefore, there is a case where paper jams occur. In order to prevent the jams, there is a method where a penetrating agent is added to accelerate water to penetrate paper. In such a method, however, it is difficult to secure storage stability of an ink because the pigment ink becomes hydrophobic, and at the same time, penetration of the pigment to printing medium becomes high to lower image density of a resulting image.

In order to solve the above-described problem, various methods have been proposed to make a pigment retain on a surface of plain paper. For example, proposed are an inkjet ink composition where a coloring material is made unstable with diphosphonic acid group of a polymer and a calcium salt in paper at the time when the coloring material is brought into contact with paper, to thereby improve image density (see, for example, Japanese Patent No. 5001291); and an inkjet printing method where a calcium salt of a receiving liquid and a phosphorus-containing group are reacted to prevent feathering and improve fixing ability (see, for example, Japanese Patent No. 4956666).

Moreover, there is a need in fields of commercial printing and industrial printing for a technique that stably produces an image of the higher resolution and definition at the higher speed. As a printing medium, as well as plain paper, coat paper, art paper, non-permeable films, such as PET films, etc. are used, and there is a need for an ink having high adaptability to a printing medium.

When an image having excellent resolution and definition is formed on a less-permeable printing medium, such as the coat paper and the art paper, or a non-permeable film at high speed, there is a problem that beading (unevenness) tends to occur. In order to solve the problem, proposed is an ink including a polymer to prevent beading (see, for example, Japanese Patent Nos. 2867491 and 4687110, Japanese Translation of PCT International Application Publication No. JP-T-2008-536963, and Japanese Unexamined Patent Application Publication No. 2012-52027).

Moreover, similarly to the inkjet printing system, an aqueous pigment ink using a pigment for stationary such as sign pens, ball-tipped pens, and plotter pens has a problem that color density on white plain paper is insufficient. In order to solve the problem, proposed is an aqueous pigment ink including an O/W emulsion of a water-insoluble (meth)acrylic resin and/or a styrene-(meth)acrylic acid copolymer (see, for example, Japanese Patent No. 4722462).

Furthermore, an aqueous pigment ink used for the inkjet printing system or the stationary has a need that a pigment that does not dissolved in water is stably dispersed in water for a long period. Therefore, proposed is a graft polymer including an aromatic ring in a chain the polymer (see, for example, Japanese Unexamined Patent Application Publication No. 2011-105866).

SUMMARY OF THE INVENTION

According to one aspect of the present disclosure, a copolymer includes a structural unit represented by General Formula (1) below, and a structural unit represented by General Formula (2) below.

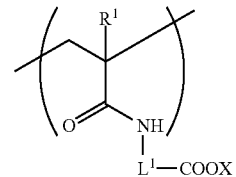

General Formula (1)

In General Formula (1), $R^1$ is a hydrogen atom or a methyl group, $L^1$ is an alkylene group having 2 or greater carbon atoms but 5 or less carbon atoms, and X is a hydrogen atom or a cation.

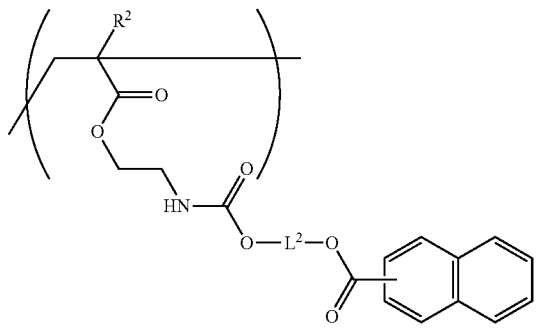

General Formula (2)

In General Formula (2), $R^2$ is a hydrogen atom or a methyl group and $L^2$ is an alkylene group having 2 or greater carbon atoms but 18 or less carbon atoms.

DESCRIPTION OF THE EMBODIMENTS (Copolymer)

Figure 1:
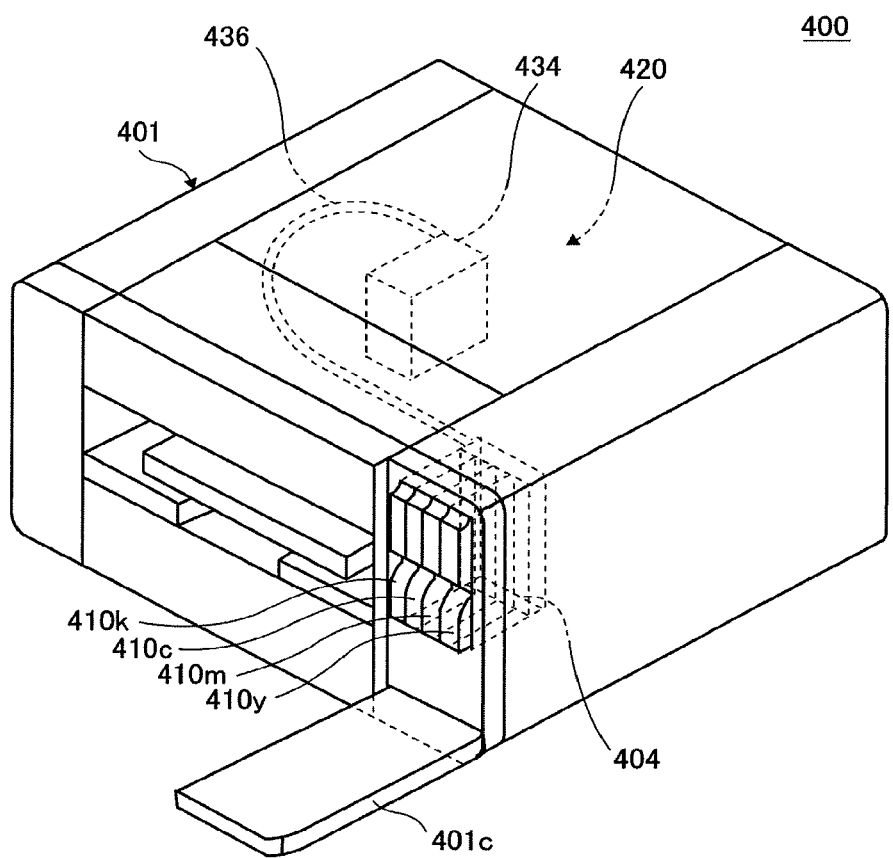
FIG. 1 is a perspective diagram illustrating one example of a serial-type image forming apparatus.

A copolymer of the present disclosure includes a structural unit represented by General Formula (1) and a structural unit represented by General Formula (2), and may further include other structural units according to the necessity.

General Formula (1)

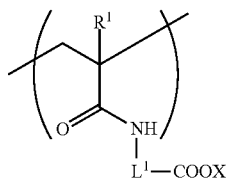

In General Formula (1), $R^1$ is a hydrogen atom or a methyl group, $L^1$ is an alkylene group having 2 or greater carbon atoms but 5 or less carbon atoms, and X is a hydrogen atom or a cation.

General Formula (2)

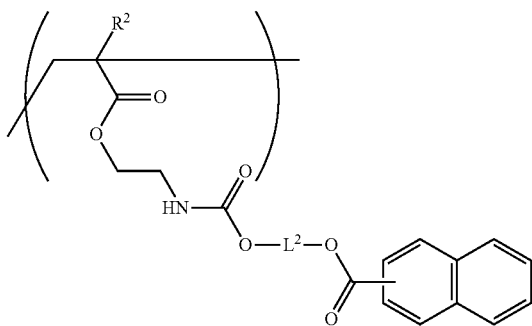

In General Formula (2), $R^2$ is a hydrogen atom or a methyl group and $L^2$ is an alkylene group having 2 or greater carbon atoms but 18 or less carbon atoms.

The copolymer of the present disclosure has been accomplished based on the following insight. Japanese Patent No. 5001291 has a problem that storage stability of the ink is low and Japanese Patent No. 4956666 has a problem that image density is insufficient when printed on plain paper. Moreover, the copolymer of the present disclosure has been accomplished based on the following insight. Japanese Patent Nos. 2867491 and 4687110, Japanese Translation of PCT International Application Publication No. JP-T-2008-536963, and Japanese Unexamined Patent Application Publication No. 2012-52027 have a problem that it is difficult to form an image on various printing media at high speed without causing beading (unevenness) and Japanese Patent No. 4722462 has a problem that color density is insufficient. Moreover, the copolymer of the present disclosure has been accomplished based on the following insight. Japanese Unexamined Patent Application Publication No. 2011-105866 has a problem that pigment-dispersibility is low and storage stability of the ink over a long period is low when the ink is used for the inkjet printing system or stationary, and does not disclose specific examples of the copolymer of the present disclosure or does not mention the copolymer of the present disclosure in Examples at all.

The present disclosure has an object to provide a copolymer effective as a binder resin or a pigment-dispersing resin of an ink.

The present disclosure can provide a copolymer effective as a binder resin or a pigment-dispersing resin of an ink. Specifically, high image density can be obtained on various printing media even at a high printing speed, when the copolymer of the present disclosure is used as a binder resin of an ink. When the copolymer of the present disclosure is used as a resin for dispersing a pigment of an ink, moreover, an ink having excellent storage stability can be obtained.

$R^1$ in General Formula (1) is a hydrogen atom or a methyl group.

$L^1$ in General Formula (1) is an alkylene group having 2 or greater carbon atoms but 5 or less carbon atoms.

X in General Formula (1) is a hydrogen atom or a cation. When X is a cation, oxygen adjacent to the cation is present as $O^-$.

Examples of the cation of X in General Formula (1) include a sodium ion, a potassium ion, a lithium ion, a tetramethyl ammonium ion, a tetraethyl ammonium ion, a tetrapropyl ammonium ion, a tetrabutyl ammonium ion, a tetrapentyl ammonium ion, a tetrahexyl ammonium ion, a triethylmethyl ammonium ion, a tributylmethyl ammonium ion, a trioctylmethyl ammonium ion, a 2-hydroxyethyltrimethylammonium ion, a tris(2-hydroxyethyl)methylammonium ion, a propyltrimethyl ammonium ion, a hexyltrimethyl ammonium ion, an octyltrimethyl ammonium ion, a nonyltrimethyl ammonium ion, a decyltrimethyl ammonium ion, a dodecyltrimethyl ammonium ion, a tetradecyltrimethyl ammonium ion, a hexadecyltrimethyl ammonium ion, an octadecyltrimethyl ammonium ion, a didodecyldimethyl ammonium ion, a ditetradecyldimethyl ammonium ion, a dihexadecyldimethyl ammonium ion, a dioctadeyldimethyl ammonium ion, an ethylhexadecyldimethyl ammonium ion, an ammonium ion, a dimethyl ammonium ion, a trimethyl ammonium ion, a monoethyl ammonium ion, a diethyl ammonium ion, a triethyl ammonium ion, a monoethanol ammonium ion, a diethanol ammonium ion, a triethanol ammonium ion, a methyl ethanol ammonium ion, a methyl diethanol ammonium ion, a dimethyl ethanol ammonium ion, a monopropanol ammonium ion, a dipropanol ammonium ion, a tripropanol ammonium ion, an isopropanol ammonium ion, a morpholinium ion, a N-methylmorpholinium ion, a N-methyl-2-pyrrolidonium ion, and a 2-pyrrolidonium ion.

The structural unit represented by General Formula (1) becomes a structural unit having a different structure depending on types of $R^1$, $L^1$, and X in General Formula (1). The structural unit represented by General Formula (1) is not particularly limited and a structural unit of a different structure may be appropriately selected depending on the intended purpose. These may be used alone or in combination.

Examples of a monomer formed of the structural unit represented by General Formula (1) include compounds represented by General Formula (3) below.

General Formula (3)

In General Formula (3), $R^1$ is a hydrogen atom or a methyl group, $L^1$ is an alkylene group having 2 or greater carbon atoms but 5 or less carbon atoms, and X is a hydrogen atom or a cation.

Examples of the compounds represented by General Formula (3) include 6-acrylamide hexanoic acid, and 3-acrylamide propionic acid.

$R^2$ in General Formula (2) is, for example, a hydrogen atom or a methyl group.

$L^2$ in General Formula (2) is an alkylene group having 2 or greater carbon atoms but 18 or less carbon atoms, preferably an alkylene group having 2 or greater carbon atoms but 16 or less carbon atoms, and more preferably an alkylene group having 2 or greater carbon atoms but 12 or less carbon atoms.

When the copolymer is used in an ink, a naphthyl group present at a terminal via $L^2$ in General Formula (2), the naphthyl group has an excellent pigment adsorption powder owing to the n-n stacking between the naphthyl group and a pigment that is a coloring material in the ink. Therefore, the pigment is immediately aggregated on a surface of a printing medium to prevent beading (unevenness) by bringing the copolymer into contact with the pigment on the printing medium at the time of printing.

The structural unit represented by General Formula (2) becomes a structural unit having a different structure depending on types of $R^2$ and $L^2$ in General Formula (2). The structural unit represented by General Formula (2) is not particularly limited and a structural unit of a different structure may be appropriately selected depending on the intended purpose. These may be used alone or in combination.

Examples of a monomer formed of the structural unit represented by General Formula (2) include compounds represented by General Formula (4) below.

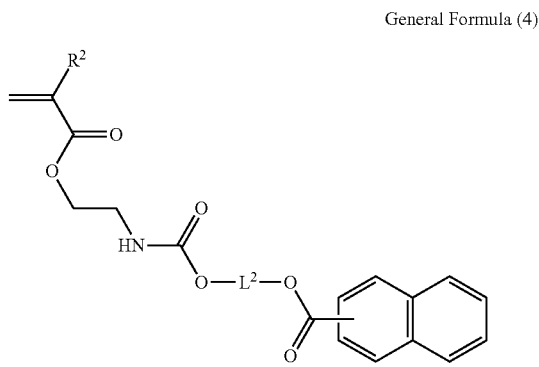

General Formula (4)

In General Formula (4), $R^2$ is a hydrogen atom or a methyl group and $L^2$ is an alkylene group having 2 or greater carbon atoms but 18 or less carbon atoms.

Examples of the compounds represented by General Formula (4) include polymers each including naphthalene carboxylic acid hydroxyalkyl ester formed of a naphthoic acid compound and a diol compound, and (meth)acryloyloxyalkyl isocyanate.

Examples of the naphthoic acid compound include 2-naphthalene carbonyl chloride.

Examples of the diol compound include 1,6-hexanediol, ethylene glycol, and 1,16-hexadecanediol. These may be used alone or in combination. Examples of the (meth) acryloyloxyalkyl isocyanate include 2-acryloyloxyethyl isocyanate and 2-methacryloyloxyethyl isocyanate. These may be used alone or in combination.

As understood from the structural unit represented by General Formula (1) and the structural unit represented by General Formula (2), the structural unit represented by General Formula (1) and the structural unit represented by General Formula (2) may be a main chain of a copolymer including a pendant group, such as a carboxyl group hanged via $L^1$ or a terminal naphthyl group hanged via $L^2$. However, it is not naturally exclude a case where part of the structural unit is included in a side chain. For example, it is a commonly known fact that it is difficult to completely remove a secondary radical polymerization reaction that generates a branched structure. In a case where a naphthyl group is present at a terminal of a side chain of the copolymer when a pigment dispersant, in which a pigment is dispersed in water, is prepared, moreover, the naphthyl group is easily adsorbed on a surface of the pigment and has a high adsorption power with the pigment, and therefore the pigment dispersion having excellent storage stability can be obtained.

The copolymer of the present disclosure is not particularly limited and may be appropriately selected depending on the intended purpose, as long as the copolymer includes the structural unit represented by General Formula (1) and the structural unit represented by General Formula (2). Examples of the copolymer include a block copolymer, a random copolymer, an alternating copolymer, and a graft copolymer. These may be used alone or in combination.

After polymerizing the monomer formed of the structural unit represented by General Formula (1) and the monomer formed of the structural unit represented by General Formula (2), the copolymer may be subjected to a neutralization treatment according to the necessity.

A molar ratio of the structural unit represented by General Formula (1) to the structural unit represented by General Formula (2) (the structural unit represented by General Formula (1):the structural unit represented by General Formula (2)) is preferably 0.1:1 or greater but 10:1 or less, more preferably 0.3:1 or greater but 5:1 or less, and particularly preferably 0.5:1 or greater but 3:1 or less, in view of an adsorption power of a pigment. Since the molar ratio (the structural unit represented by General Formula (1):the structural unit represented by General Formula (2)) is in the range of 0.1:1 or greater but 10:1 or less, an adsorption power of a pigment can be improved, beading is prevented, and storage stability of an ink can be improved, when the copolymer is used for an ink.

A number average molecular weight of the copolymer is preferably 500 or greater but 10,000 or less.

A weight average molecular weight of the copolymer is preferably 1,500 or greater but 30,000 or less.

For example, the number average molecular weight and the weight average molecular weight can be measured through polystyrene conversion by gel permeation chromatography (GPC).

Other than the structural units represented by General Formulae (1) and (2), the copolymer may further include structural units formed of other polymerizable monomers.

The above-mentioned other polymerizable monomers are not particularly limited and may be appropriately selected depending on the intended purpose. Examples of the polymerizable monomers include polymerizable hydrophobic monomers, polymerizable hydrophilic monomers, and polymerizable surfactants. These may be used alone or in combination.

Examples of the polymerizable hydrophobic monomers include: unsaturated ethylene monomers each having an aromatic ring, such as α-methylstyrene, 4-t-butylstyrene, and 4-chloromethylstyrene; alkyl (meth)acrylate, such as methyl (meth)acrylate, ethyl (meth)acrylate, n-butyl (meth) acrylate, dimethyl maleate, dimethyl itaconate, dimethyl fumarate, lauryl (meth)acrylate (the number of carbon atoms in the lauryl site: 12), tridecyl (meth)acrylate (the number of carbon atoms in the tridecyl site: 13), tetradecyl (meth) acrylate (the number of carbon atoms in the tetradecyl site: 14), pentadecyl (meth)acrylate (the number of carbon atoms in the pentadecyl site: 15), hexadecyl (meth)acrylate (the number of carbon atoms in the hexadecyl site: 16), heptadecyl (meth)acrylate (the number of carbon atoms in the heptadecyl site: 17), nonadecyl (meth)acrylate (the number of carbon atoms in the nonadecyl site: 19), eicosyl (meth) acrylate (the number of carbon atoms in the eicosyl site: 20), henicosyl (meth)acrylate (the number of carbon atoms in the henicosyl site: 21), and docosyl (meth)acrylate (the number of carbon atoms in the docosyl site: 22); and unsaturated ethylene monomers each having an alkyl group, such as 1-heptene, 3,3-dimethyl-1-pentene, 4,4-dimethyl-1-pentene, 3-methyl-1-hexene, 4-methyl-1-hexene, 5-methyl-1-hexene, 1-octene, 3,3-dimethyl-1-hexene, 3,4-dimethyl-1-hexene, 4,4-dimethyl-1-hexene, 1-nonene, 3,5,5-trimethyl-1-hexene, 1-decene, 1-undecene, 1-dodecene, 1-tridecene, 1-tetradecene, 1-pentadecene, 1-hexadecene, 1-heptadecene, 1-octadecene, 1-nonadecene, 1-eicosene, and 1-docosene. These may be used alone or in combination.

Examples of the polymerizable hydrophilic monomers include: anionic unsaturated ethylene monomers, such as unsaturated ethylene monomers each including maleic acid or maleic acid salt, itaconic acid, monomethyl itaconate, fumaric acid, 4-styrenesulfonic acid, 2-acrylamide-2-methylpropanesulfonic acid, phosphoric acid, phosphonic acid, alendronic acid, or etidronic acid; and nonionic unsaturated ethylene monomers, such as 2-hydroxyethyl (meth)acrylate, diethylene glycol mono(meth)acrylate, triethylene glycol mono(meth)acrylate, tetraethylene glycol mono(meth)acrylate, polyethylene glycol mono(meth)acrylate, (meth)acrylamide, N-methylol (meth)acrylamide, N-vinylformamide, N-vinylacetoamide, N-vinylpyrrolidone, acryl amide, N,N-dimethylacrylamide, N-t-butylacrylamide, N-octylacrylamide, and N-t-octylacrylamide. These may be used alone or in combination.

The polymerizable hydrophobic monomers and the polymerizable hydrophilic monomers may be used alone or in combination.

A total amount of the polymerizable hydrophobic monomers and the polymerizable hydrophilic monomers is preferably 2.5% by mass or greater but 50% by mass or less relative to a total amount of monomers for forming the copolymer.

Examples of the polymerizable surfactants include anionic surfactants and nonionic surfactants all having at least one unsaturated double bond group capable of radically polymerizing per molecule. These may be used alone or in combination.

Examples of the anionic surfactant include a hydrocarbon compound including a sulfuric acid salt group, such as an ammonium sulfate group ($-SO_3-NH_4^+$), and an allyl group ($-CH_2-CH=CH_2$), a hydrocarbon compound including a sulfuric acid salt group, such as an ammonium sulfate group ($-SO_3-NH_4^+$) and a methacryl group [$-CO-C(CH_3)=CH_2$], and an aromatic hydrocarbon group including a sulfuric acid salt group, such as an ammonium sulfate group ($-SO_3-NH_4^+$) and 1-propenyl group ($-CH=CH_2CH_3$). These may be used alone or in combination.

As the anionic surfactant, a commercial product can be used. Examples of the commercial product include: the product name, ELEMINOL JS-20 and the product name, RS-300 (both available from Sanyo Chemical Industries, Ltd.); and the product name, Aqualon KH-10, the product name, Aqualon KH-1025, the product name, Aqualon KH-05, the product name, Aqualon HS-10, the product name, Aqualon HS-1025, the product name, Aqualon BC-0515, the product name, Aqualon BC-10, the product name, Aqualon BC-1025, the product name, Aqualon BC-20, and the product name, Aqualon BC-2020 (all available from DKS Co., Ltd.). These may be used alone or in combination.

Examples of the nonionic surfactant include a hydrocarbon compound including a 1-propenyl group ($-CH=CH_2CH_3$) and a polyoxyethylene group [$-(C_2H_4O)_n-H$], and an aromatic hydrocarbon compound.

As the nonionic surfactant, a commercial product can be used. Examples of the commercial product include: the product name, Aqualon RN-20, the product name, Aqualon RN-2025, the product name, Aqualon RN-30, and the product name, Aqualon RN-50 (all available from DKS Co., Ltd.); and the product name, LATEMUL PD-104, the product name, LATEMUL PD-420, the product name, LATEMUL PD-430, and the product name, LATEMUL PD-450 (all available from Kao Corporation). These may be used alone or in combination.

An amount of the polymerizable surfactant is preferably 0.05% by mass or greater but 5% by mass or less relative to a total amount of monomers for forming the copolymer.

The copolymer of the present disclosure can be polymerized as presented in Reaction Formulae (1) to (3) below. Note that, $L^1$, $R^1$, $L^2$, and $R^2$ in Reaction Formulae (1) to (3) are identical to $L^1$, $R^1$, $L^2$, and $R^2$ in General Formulae (1) and (2).

First, as presented in Reaction Formula (1) below, (A-1) naphthalene carbonyl chloride and an excess amount of a diol compound are allowed to go through a condensation reaction in the presence of an acid receptor, such as amine and pyridine, to obtain (A-2) naphthalene carboxylic acid hydroxyalkyl ester.

(Reaction Formula (1))

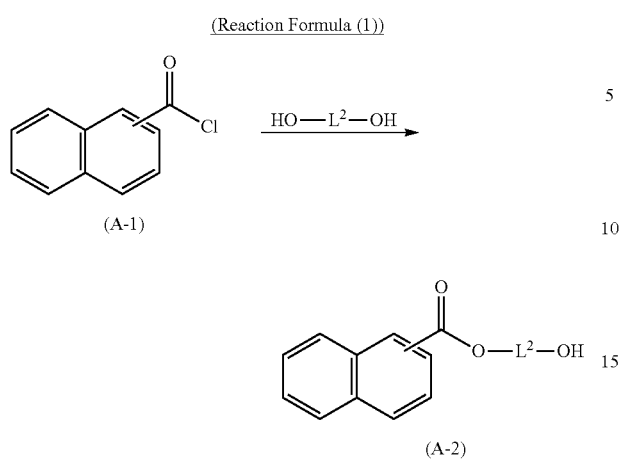

(A-1) → (A-2)

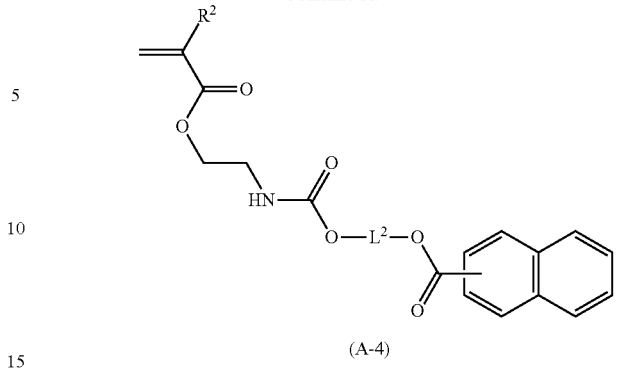

(A-4)

Next, as presented in Reaction Formula (3) below, (A-5) a (meth)acrylic acid amide monomer and the (A-4) are copolymerized in the presence of a radical polymerization initiator to thereby obtain a copolymer (A-6) of the present disclosure.

(Reaction Formula (3))

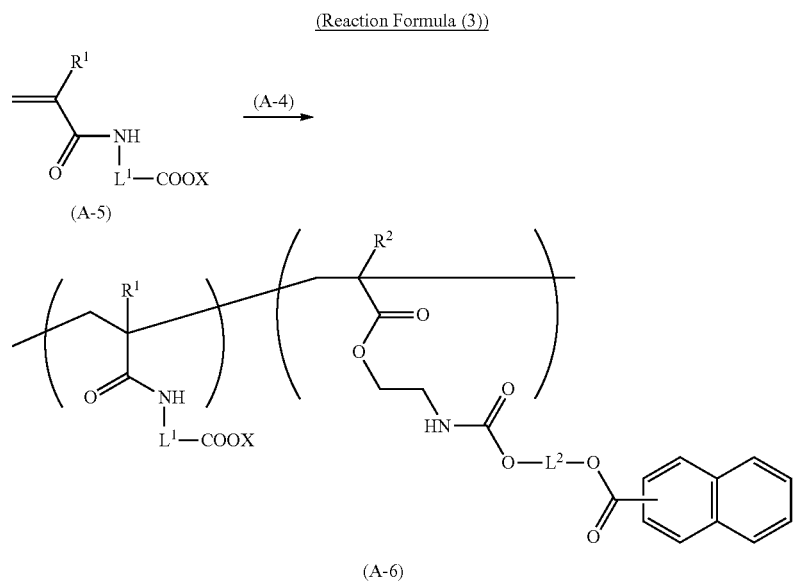

(A-5) → (A-6)

As presented in Reaction Formula (2) below, subsequently, (A-3) 2-methacryloyloxyethyl isocyanate and the (A-2) are allowed to react to obtain a monomer (A-4).

Moreover, the copolymer represented by (A-6) may be subjected to a neutralization treatment according to the necessity.

Note that, both terminals of the copolymer may be hydrogen atoms, may be other than hydrogen atoms, and may be identical or different.

The radical polymerization initiator is not particularly limited and may be appropriately selected depending on the intended purpose. Examples of the radical polymerization initiator include: organic peroxides, such as peroxyketal, hydroperoxide, dialkyl peroxide, diacyl peroxide, peroxydicarbonate, and peroxyester; and azo-compounds, such as cyano-based azobisisobutyronitrile, azobis(2-methylbutyronitrile), azobis(2,2'-isovaleronitrile), and non-cyano-based dimethyl-2,2'-azobisisobutylate. These may be used alone or in combination. Among them, the organic peroxide and the azo-compound are preferable and the azo-compound is particularly preferable in view of easiness of control of an average molecular weight and a low decomposition temperature.

An amount of the radical polymerization initiator is not particularly limited and may be appropriately selected (Reaction Formula (2))

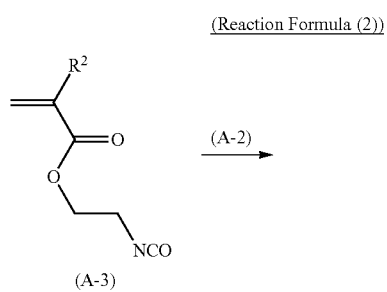

(A-3) + (A-2) → depending on the intended purpose. The amount of the radical polymerization initiator is preferably 1% by mass or greater but 10% by mass or less relative to a total amount of the polymerizable monomers.

An appropriate amount of a chain-transfer agent may be added in order to adjust an average molecular weight of the copolymer.

Examples of the chain-transfer agent include mercaptoacetic acid, mercaptopropionic acid, 2-propanethiol, 2-mercaptoethanol, thiophenol, dodecylmercaptan, 1-dodecanethiol, and thioglycerol. These may be used alone or in combination.

Polymerization conditions for the copolymerization, such as a polymerization temperature and a polymerization duration, are not particularly limited and may be appropriately selected depending on the intended purpose.

The polymerization temperature is not particularly limited and may be appropriately selected, but the polymerization temperature is preferably 50° C. or higher but 150° C. or lower, and more preferably 60° C. or higher but 100° C. or lower.

The polymerization duration is not particularly limited and may be appropriately selected depending on the intended purpose, but the polymerization duration is preferably 3 hours or longer but 48 hours or shorter.

Examples of a polymerization method of the copolymer include solution polymerization and emulsion polymerization. These may be used alone or in combination.

<Identification Method of Copolymer>

As an identification method of the copolymer, for example, the copolymer can be identified by using a 1H-NMR spectrum or IR spectrum.

The $^1$H-NMR spectrum can be measured by means of $^1$H-NMR (500 MHz) (available from JEOL Ltd).

The IR spectrum can be measured by means of FT-IR SpectrumGX (available from PerkinElmer Inc.).

Use of the copolymer of the present disclosure is not particularly limited. For example, the copolymer is suitably used for inks or films.

(Ink)

An ink of the present disclosure includes water, a coloring material, and a copolymer, and may further include other ingredients according to the necessity. As the copolymer, a copolymer identical to the copolymer of the present disclosure can be used. The copolymer may be used alone, or as the copolymer two or more copolymers may be used in combination.

The ink using the copolymer of the present disclosure provide high image density even when the ink is printed on plain paper, does not cause beading (unevenness) even at high speed printing, and has excellent storage stability.

<Coloring Material>

Examples of the coloring material include pigments and dyes. These may be used alone or in combination. Among them, a pigment is preferable in view of in view of the better absorption ability of the pigment to the copolymer as the coloring material than the dye, and water resistance and lightfastness.

The pigment is not particularly limited and may be appropriately selected depending on the intended purpose. Examples of the pigment include inorganic pigments and organic pigments for black or colors. These may be used alone or in combination. Among these pigments, a pigment having good compatibility to water is particularly preferably used.

Examples of the inorganic pigments include titanium oxide, iron oxide, calcium carbonate, barium sulfate, aluminium hydroxide, barium yellow, cadmium red, and chrome yellow, as well as carbon black produced by conventional methods, such as a contact method, a furnace method, and a thermal method. These may be used alone or in combination.

Examples of the pigment for black include: carbon black (C.I. Pigment Black 7), such as furnace black, lamp black, acetylene black, and channel black; metals, such as copper and iron (C.I. Pigment Black 11); metal oxides such as titanium oxide; and organic pigments, such as aniline black (C.I. Pigment Black 1).

The carbon black is preferably carbon black, which is produced by a furnace method or a channel method, and has a primary particle diameter of 15 nm or greater but 40 nm or less, a BET specific surface area of 50 m$^2$/g or greater but 300 m$^2$/g or less, DBP oil absorption of 40 mL/100 g or greater but 150 mL/100 g or less, a volatile component of 0.5% or greater but 10% or less, and pH of 2 or higher but 9 or less.

Examples of the organic pigments include azo pigment, polycyclic pigments, dye chelates, nitro pigments, nitroso pigments, and aniline black. These may be used alone or in combination.

Examples of the azo pigments include azo lake, insoluble azo pigments, condensed azo pigments, and chelate azo pigments. These may be used alone or in combination.

Examples of the polycyclic pigments include phthalocyanine pigments, perylene pigments, perynone pigments, anthraquinone pigments, quinacridone pigments, dioxazine pigments, indigo pigments, thioindigo pigments, isoindolinone pigments, quinophthalone pigments, and rhodamine B lake pigments. These may be used alone or in combination.

Examples of the dye chelates include base dye-based chelates, and acid dye-based chelates. These may be used alone or in combination.

Examples of the pigments for colors include a pigment for yellow, a pigment for magenta, and a pigment for cyan.

The pigment for yellow is not particularly limited and may be appropriately selected depending on the intended purpose. Examples of the pigment for yellow include C.I. Pigment Yellow 1, C.I. Pigment Yellow 2, C.I. Pigment Yellow 3, C.I. Pigment Yellow 12, C.I. Pigment Yellow 13, C.I. Pigment Yellow 14, C.I. Pigment Yellow 16, C.I. Pigment Yellow 17, C.I. Pigment Yellow 73, C.I. Pigment Yellow 74, C.I. Pigment Yellow 75, C.I. Pigment Yellow 83, C.I. Pigment Yellow 93, C.I. Pigment Yellow 95, C.I. Pigment Yellow 97, C.I. Pigment Yellow 98, C.I. Pigment Yellow 114, C.I. Pigment Yellow 120, C.I. Pigment Yellow 128, C.I. Pigment Yellow 129, C.I. Pigment Yellow 138, C.I. Pigment Yellow 150, C.I. Pigment Yellow 151, C.I. Pigment Yellow 154, C.I. Pigment Yellow 155, C.I. Pigment Yellow 174, and C.I. Pigment Yellow 180. These may be used alone or in combination.

The pigment for magenta is not particularly limited and may be appropriately selected depending on the intended purpose. Examples of the pigment for magenta include C.I. Pigment Red 5, C.I. Pigment Red 7, C.I. Pigment Red 12, C.I. Pigment Red 48(Ca), C.I. Pigment Red 48(Mn), C.I. Pigment Red 57(Ca), C.I. Pigment Red 57:1, C.I. Pigment Red 112, C.I. Pigment Red 122, C.I. Pigment Red 123, C.I. Pigment Red 146, C.I. Pigment Red 168, C.I. Pigment Red 176, C.I. Pigment Red 184, C.I. Pigment Red 185, C.I. Pigment Red 202, and Pigment Violet 19. These may be used alone or in combination.

The pigment for cyan is not particularly limited and may be appropriately selected depending on the intended purpose. Examples of the pigment for cyan include C.I. Pigment Blue 1, C.I. Pigment Blue 2, C.I. Pigment Blue 3, C.I. Pigment Blue 15, C.I. Pigment Blue 15:3, C.I. Pigment Blue 15:4, C.I. Pigment Blue 15:34, C.I. Pigment Blue 16, C.I. Pigment Blue 22, C.I. Pigment Blue 60, C.I. Pigment Blue 63, C.I. Pigment Blue 66, C.I. Vat Blue 4, and C.I. Vat Blue 60. These may be used alone or in combination A well-balanced ink having excellent color tone and lightfastness can be obtained by, among the above-listed examples, using C.I. Pigment Yellow 74 as the pigment for yellow, using C.I. Pigment Red 122 or C.I. Pigment Violet 19 as the pigment for magenta, and using C.I. Pigment Blue 15:3 for the pigment for cyan.

A coloring material freshly produced for the present disclosure may be used for the ink of the present disclosure.

Moreover, examples of the pigment include self-dispersible pigments in view of coloring of an obtainable image. Among them, an anionic self-dispersible pigment is preferable. The anionic self-dispersible pigment is a pigment whose dispersion state is stabilized by introducing an anionic functional group directly or via another atomic group to a surface of the pigment.

As the pigment before a dispersion state of which is stabilized, various pigments known in the art, such as the pigments listed in International Publication No. WO2009/014242, can be used. Note that, the anionic functional group is a functional group, from which a half or more hydrogen ions are detached at pH 7.0.

Specific examples of the anionic functional group include a carboxyl group, a sulfo group, and a phosphonic acid group. These may be used alone or in combination. Among them, a carboxyl group and a phosphonic acid group are preferable because optical density of an obtainable image is enhanced.

Examples of a method for introducing an anionic functional group into a surface of the pigment include a method for oxidizing carbon black.

Examples of the method for oxidizing include a method for processing with hypochlorite, ozonation water, hydrogen peroxide, chlorite, or nitric acid, and a surface treatment method using diazonium salt as disclosed in Japanese Patent No. 3808504, Japanese Translation of PCT International Application Publication No. JP-T-2009-515007, and Japanese Translation of PCT International Application Publication No. JP-T-2009-506196.

Examples of commercially available pigments to surfaces of which hydrophilic functional groups are introduced include: the product name, CW-1, the product name, CW-2, and the product name, CW-3 (all available from ORIENT CHEMICAL INDUSTRIES CO., LTD.); and the product name, CAB-O-JET200, the product name: CAB-O-JET300, and the product name: CAB-O-JET400 (available from Cabot Corporation).

An amount of the pigment is preferably 0.5% by mass or greater but 20% by mass or less and more preferably 1% by mass or greater but 10% by mass or less relative to a total amount of the ink.

As the dyes, dyes classified by Color Index as acid dyes, direct dyes, basic dyes, reactive dyes, and food dyes can be used.

Examples of the acid dyes and the food dyes include: C.I. Acid Black 1, 2, 7, 24, 26, and 94; C.I. Acid Yellow 17, 23, 42, 44, 79, and 142; C.I. Acid Blue 9, 29, 45, 92, and 249; C.I. Acid Red 1, 8, 13, 14, 18, 26, 27, 35, 37, 42, 52, 82, 87, 89, 92, 97, 106, 111, 114, 115, 134, 186, 249, 254, and 289; C.I. Food Black 1 and 2; C.I. Food Yellow 3 and 4; and C.I. Food Red 7, 9, and 14. These may be used alone or in combination.

Examples of the direct dyes include: C.I. Direct Black 19, 22, 32, 38, 51, 56, 71, 74, 75, 77, 154, (168), and 171; C.I. Direct Yellow 1, 12, 24, 26, 33, 44, 50, 86, 120, 132, 142, and 144; C.I. Direct Blue 1, 2, 6, 15, 22, 25, 71, 76, 79, 86, 87, 90, 98, 163, 165, 199, and 202; C.I. Direct Red 1, 4, 9, 13, 17, 20, 28, 31, 39, 80, 81, 83, 89, 225, and 227; and C.I. Direct Orange 26, 29, 62, and 102. These may be used alone or in combination.

Examples of the basic dyes include: C.I. Basic Black 2 and 8; C.I. Basic Yellow 1, 2, 11, 13, 14, 15, 19, 21, 23, 24, 25, 28, 29, 32, 36, 40, 41, 45, 49, 51, 53, 63, 64, 65, 67, 70, 73, 77, 87, and 91; C.I. Basic Blue 1, 3, 5, 7, 9, 21, 22, 26, 35, 41, 45, 47, 54, 62, 65, 66, 67, 69, 75, 77, 78, 89, 92, 93, 105, 117, 120, 122, 124, 129, 137, 141, 147, and 155; and C.I. Basic Red 2, 12, 13, 14, 15, 18, 22, 23, 24, 27, 29, 35, 36, 38, 39, 46, 49, 51, 52, 54, 59, 68, 69, 70, 73, 78, 82, 102, 104, 109, and 112. These may be used alone or in combination.

Examples of the reactive dye include: C.I. Reactive Black 3, 4, 7, 11, 12, and 17; C.I. Reactive Yellow 1, 5, 11, 13, 14, 20, 21, 22, 25, 40, 47, 51, 55, 65, and 67; C.I. Reactive Blue 1, 2, 7, 14, 15, 23, 32, 35, 38, 41, 63, 80, and 95; and C.I. Reactive Red 1, 14, 17, 25, 26, 32, 37, 44, 46, 55, 60, 66, 74, 79, 96, and 97. These may be used alone or in combination.

The proportion of the coloring material in ink is preferably from 0.1% by mass or greater but 15% by mass or less and more preferably from 1% by mass or greater but 10% by mass or less in terms of enhancement of image density, fixability, and discharging stability.

The ink of the present disclosure preferably includes a water-soluble organic solvent in order to enhance permeation of the ink to plain paper or coated paper to prevent occurrences of beading, and to prevent drying of the ink through a wetting effect of the water-soluble organic solvent.

The water-soluble organic solvent is not particularly limited. Examples of the water-soluble organic solvent include: polyvalent alcohols, such as ethylene glycol, diethylene glycol, triethylene glycol, tetraethylene glycol, polyethylene glycol, propylene glycol, dipropylene glycol, tripropylene glycol, polypropylene glycol, 1,3-butanediol, 3-methyl-1,3-butanediol, trimethylol ethane, trimethylol propane, 1,5-pentanediol, 2,2,4-trimethyl-1,3-pentanediol, 1,6-hexanediol, hexylene glycol, glycerin, 1,2,3-butanetriol, 1,2,4-butanetriol, 1,2,6-hexanetriol, isopropylidene glycerol, and 3-methylpentane-1,3,5-triol; polyvalent alcohol alkyl ethers, such as ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether; polyvalent alcohol aryl ethers, such as ethylene glycol monophenyl ether, and ethylene glycol monobenzyl ether; nitrogen-containing heterocyclic compounds, such as 2-pyrrolidone, N-methyl-2-pyrrolidone, N-hydroxyethyl-2-pyrrolidone, 1,3-dimethylimidazolidinone, ε-caprolactam, and γ-butyrolactone; amides, such as formamide, N-methylformamide, N,N-dimethylformamide, 3-methoxy-N,N-dimethylpropionamide, 3-butoxy-N,N-dimethylpropionamide, N,N-dimethyl-ß-methoxypropionamide, and N,N-dimethyl-ß-butoxypropionamide; amines, such as monoethanol amine, diethanol amine, triethanol amine, monoethyl amine, diethyl amine, and triethyl amine; sulfur-containing compounds, such as dimethyl sulfoxide, sulfolane, and thiodiethanol; 3-ethyl-3-hydroxymethyloxetane; propylene carbonate; and ethylene carbonate. These may be used alone or in combination.

Among them, 3-ethyl-3-hydroxymethyloxetane, isopropylidene glycerol, N,N-dimethyl-ß-methoxypropionamide, and N,N-dimethyl-ß-butoxypropionamide are preferable in view of prevention of curling of plain paper.

Moreover, diethylene glycol, triethylene glycol, 1,3-butanediol, 2,2,4-trimethyl-1,3-pentanediol, and glycerin are excellent in view of prevention of discharge failures caused by evaporation of moisture.

Moreover, examples of a water-soluble organic solvent having permeability but relatively less wettability include 2-ethyl-1,3-hexanediol [solubility: 4.2% (25° C.)], and 2,2,4-trimethyl-1,3-pentanediol [solubility: 2.0% (25° C.)]. These may be used alone or in combination.

As water-soluble organic solvents other than above, examples of aliphatic diols include 2-ethyl-2-methyl-1,3-propanediol, 2,2-diethyl-1,3-propanediol, 2-methyl-2-propyl-1,3-propanediol, 3,3-dimethyl-1,2-butanediol, 2,4-dimethyl-2,4-pentanediol, 2,5-dimethyl-2,5-hexanediol, and 5-hexene-1,2-diol. These may be used alone or in combination.

Moreover, examples of a water-soluble organic solvent that can be used in combination with any of the above-listed water-soluble organic solvent include: alkyl or aryl ethers of polyvalent alcohol, such as diethylene glycol monobutyl ether, propylene glycol monobutyl ether, ethylene glycol monophenyl ether, diethylene glycol monophenyl ether, ethylene glycol monoallyl ether, and tetraethylene glycol chlorophenyl ether; and lower alcohols, such as ethanol. These may be used alone or in combination.

The ink of the present disclosure preferably includes a surfactant in order to enhance permeability and wettability of the ink to plain paper or coated paper and to prevent occurrences of beading.

Examples of the surfactant include fluorine-based surfactants, silicone-based surfactants, anionic surfactants, nonionic surfactants and betaine-based surfactants. These may be used alone or in combination.

Among them, fluorine-based surfactants and silicone-based surfactants are preferable because surface tension of the ink can be reduced to 30 mN/m or lower.

Examples of the fluorine-based surfactants include nonionic fluorine-based surfactants, anionic fluorine-based surfactants, amphoteric fluorine-based surfactants, and oligomer fluorine-based surfactants. Moreover, a fluorine-based surfactant in which the number of carbon atoms substituted with fluorine is 2 or greater but 16 or less is preferable, and a fluorine-based surfactant in which the number of carbon atoms substituted with fluorine is 4 or greater but 16 or less is more preferable. When the number of carbon atoms substituted with fluorine is 2 or greater, an effect unique to the fluorine-based surfactant can be obtained. When the number of carbon atoms substituted with fluorine is 16 or less, storage stability can be improved.

Examples of the nonionic fluorine-based surfactants include perfluoroalkyl phosphoric acid ester compounds, perfluoroalkyl ethylene oxide adducts, and polyoxyalkylene ether polymer compounds each having a perfluoroalkyl ether group in a side chain of the polymer. These may be used alone or in combination. Among them, polyoxyalkylene ether polymer compounds each having a perfluoroalkyl ether group in a side chain of the polymer are preferable because of low foamability.

Examples of the anionic fluorine-based surfactants include perfluoroalkyl sulfonic acid compounds, perfluoroalkyl carboxylic acid compounds, perfluoroalkyl phosphoric acid ester compounds, and polyoxyalkylene ether polymer compounds each having a perfluoroalkyl ether group in a side chain of the polymer. These may be used alone or in combination.

Examples of the perfluoroalkyl sulfonic acid compounds include perfluoroalkyl sulfonic acid and perfluoroalkyl sulfonic acid salt. These may be used alone or in combination.

Examples of the perfluoroalkyl carboxylic acid compounds include perfluoroalkyl carboxylic acid and perfluoroalkyl carboxylic acid salt. These may be used alone or in combination.

Examples of the perfluoroalkyl phosphoric acid ester compounds include perfluoroalkyl phosphoric acid ester and a salt of perfluoroalkyl phosphoric acid ester. These may be used alone or in combination.

Examples of the polyoxyalkylene ether polymer compounds each having a perfluoroalkyl ether group in a side chain of the polymer include a polyoxyalkylene ether polymer having a perfluoroalkyl ether group in a side chain of the polymer, a sulfuric acid ester salt of a polyoxyalkylene ether polymer having a perfluoroalkyl ether group in a side chain of the polymer, and a salt of a polyoxyalkylene ether polymer having a perfluoroalkyl ether group in a side chain of the polymer. These may be used alone or in combination.

Examples of counter ions in the above-listed fluorine-based surfactants includes ions of Li, Na, K, $NH_4$, $NH_3CH_2CH_2OH$, $NH_2(CH_2CH_2OH)_2$, or $NH(CH_2CH_2OH)_3$.

Examples of commercial products of the fluorine-based surfactants include: the product names, SURFLON S-111, S-112, S-113, S-121, S-131, S-132, S-141, and S-145 (all available from ASAHI GLASS CO., LTD.); FLUORAD FC-93, FC-95, FC-98, FC-129, FC-135, FC-170C, FC-430, and FC-431 (all available from 3M Japan Limited); MEGAFACE F-470, F-1405, and F-474 (all available from DIC CORPORATION); Zonyl TBS, FSP, FSA, FSN-100, FSN, FSO-100, FSO, FS-300, and UR (all available from DuPont); FTERGENT FT-110, FT-250, FT-251, FT-400S, FT-150, and FT-400SW (all available from NEOS COMPANY LIMITED); and POLYFOX PF-136A, PF-156A, PF-151N, PF-154, and PF-159 (all available from OMNOVA SOLUTIONS INC.). These may be used alone or in combination.

Among them, FS-300 available from DuPont, FT-110, FT-250, FT-251, FT-400S, FT-150, and FT-400SW all available from NEOS COMPANY LIMITED, and POLYFOX PF-151N available from OMNOVA SOLUTIONS INC. are preferable because use of any of the above-listed products significantly achieves excellent print quality, particularly coloring, and significantly improves levelness of dying.

The silicone-based surfactants are not particularly limited and may be appropriately selected depending on the intended purpose. Examples of the silicone-based surfactant include side-chain-modified polydimethyl siloxane, both end-modified polydimethylsiloxane, one-end-modified polydimethylsiloxane, and side-chain-both-end-modified polydimethylsiloxane. These may be used alone or in combination. Among them, a polyether-modified silicone-based surfactant including a polyoxyethylene group and polyoxyethylene polyoxypropylene group as modifying groups is preferable because such a surfactant exhibits excellent properties as a water-based surfactant.

Commercial products of the silicone-based surfactants can be readily available from, for example, BYL Japan K.K., Shin-Etsu Silicone Co., Ltd., Dow Corning Toray Co., Ltd., NIHON EMULSION Co., Ltd., Kyoeisha Chemical Co., Ltd., etc.

Examples of the anionic surfactants include polyoxyethylene alkyl ether acetic acid salt, dodecyl benzene sulfonic acid salt, lauryl acid salt, and a salt of polyoxyethylene alkyl ether sulfate. These may be used alone or in combination.

Examples of the nonionic surfactants include polyoxyethylene alkyl ether, polyoxypropylene alkyl ether, polyoxyethylene alkyl ester, polyoxyethylene sorbitan fatty acid ester, polyoxyethylene alkyl phenyl ether, polyoxyethylene alkyl amine, and polyoxyethylene alkyl amide. These may be used alone or in combination.

<Water>

The proportion of water in the ink has no particular limit and may be appropriately selected depending on the intended purpose. In terms of the drying property and discharging reliability of the ink, the proportion is preferably from 10% by mass or greater but 90% by mass or less and more preferably from 20% by mass through 60% by mass.

The water is not particularly limited and may be appropriately selected depending on the intended purpose. Examples of the water include pure water and ultrapure water, such as ion-exchanged water, ultrafiltration water, Mill Q water, and distilled water.

<Other Ingredients>

As the above-mentioned other ingredients, for example, a pH regulator, preservatives and fungicides, a corrosion inhibitor, an antioxidant, a UV absorber, an oxygen absorber, a light stabilizer, etc. can be appropriately added according to the necessity.

The pH regulator is not particularly limited and may be appropriately selected depending on the intended purpose as long as the pH regulator can adjust pH of an ink to be formulated to a range of 8.5 or greater but 11 or less without adversely affecting the ink. Examples of the pH regulator include alcohol amines, hydroxides of alkali metal elements, hydroxides of ammonium, phosphonium hydroxides, and carbonates of alkali metals. These may be used alone or in combination.

Examples of the alcohol amines include diethanol amine, triethanol amine, and 2-amino-2-ethyl-1,3-propanediol. These may be used alone or in combination.

Examples of the hydroxides of alkali metal elements include lithium hydroxide, sodium hydroxide, and potassium hydroxide. These may be used alone or in combination.

Examples of the hydroxides of ammonium include ammonium hydroxide, and quaternary ammonium hydroxide. These may be used alone or in combination.

Examples of the phosphonium hydroxides include quaternary phosphonium hydroxide.

Examples of the carbonates of alkali metals include lithium carbonate, sodium carbonate, and potassium carbonate. These may be used alone or in combination.

<Preservatives and Fungicides>

The preservatives and fungicides are not particularly limited. Examples of the preservatives and fungicides include 1,2-benzisothiazolin-3-one.

<Corrosion Inhibitor>

The corrosion inhibitor has not a particular limit. Examples thereof are acid sulfite and sodium thiosulfate.

Examples of the antioxidant include phenol-based antioxidants (including hindered phenol-based antioxidants), amine-based antioxidants, sulfur-based antioxidants, and phosphorous-based antioxidants. These may be used alone or in combination.

Examples of the UV absorber include benzophenone-based UV absorbers, benzotriazole-based UV absorbers, salicylate-based UV absorbers, cyanoacrylate-based UV absorbers, and nickel complex salt-based UV absorbers. These may be used alone or in combination.

—Production Method—

For example, the ink of the present disclosure can be produced by dispersing or dissolving, in an aqueous medium, the water, the coloring material, the copolymer, and optionally the water-soluble organic solvent, the surfactant, and the above-mentioned other ingredients, and stirring and mixing the mixture. Moreover, the copolymer may be used as a pigment-dispersing resin used at the time of production of a pigment dispersion.

The dispersing can be performed, for example, by a sand mill, a homogenizer, a ball mill, a paint shaker, or an ultrasonic disperser.

The stirring and mixing can be performed, for example, by a stirrer using a general stirring blade, a magnetic stirrer, or a high-speed disperser.

It is preferred during the production that coarse particles be removed from the ink by a filter or a centrifugal separator and the ink be deaerated.

The property of the ink is not particularly limited and may be appropriately selected depending on the intended purpose. For example, viscosity, surface tension, pH, etc., are preferably in the following ranges.

The viscosity of the ink at 25° C. is preferably 5 mPa·s or greater but 30 mPa·s or less and more preferably 5 mPa·s or greater but 25 mPa·s or less. The viscosity can be measured by, for example, a rotatory viscometer (RE-80L, available from TOKI SANGYO CO., LTD.). As the measuring conditions, the viscosity can be measured at 25° C., with a standard corn rotor (1°34'×R24) and a sample liquid amount of 1.2 mL, at the number of rotations of 50 rpm, for 3 minutes.

The surface tension of the ink is preferably 35 mN/m or less and more preferably 32 mN/m or less at 25° C. in terms that the ink is suitably leveled on a print medium and the drying time of the ink is shortened.

The pH of the ink is preferably from 7 through 12 and more preferably from 8 through 11 in terms of prevention of corrosion of metal materials contacting the ink.

<Ink-Stored Container>

The ink-stored container includes a container and the ink of the present disclosure stored in the container.

The ink-stored container includes a container and the ink stored in the container, and may further include other members appropriately selected according to the necessity.

The container is not particularly limited, and a shape, structure, size, material, etc. of the container may be appropriately selected depending on the intended purpose. Examples of the container include a container including at least an ink bag formed of an aluminium laminate film, a resin film, etc.

<Printing Device and Printing Method>

The ink of the present disclosure can be suitably applied to various printing devices employing an inkjet printing method, such as printers, facsimile machines, photocopiers, printer/fax/copier multifunction peripherals, and 3D model manufacturing devices.

In the present disclosure, the printing device and the printing method represent a device capable of discharging an ink, various processing fluids, etc. to a print medium and a method printing an image on the print medium using the device. The print medium means an article on which the ink or the various processing fluids can be attached at least temporarily.

The printing device may further optionally include a device relating to feeding, transferring, and ejecting the print medium and other devices referred to as a pre-processing device, a post-processing device, etc. in addition to the head portion to discharge the ink.

The printing device and the printing method may further optionally include a heater fir use in the heating process and a drier for use in the drying process. For example, the heater and the dryer include a heating device and a drying device heat and dry the printed surface of the bottom surface of a print medium. The heater and the dryer are not particularly limited. For example, a fan heater and an infra-red heater can be used. The print medium can be heated and dried before, during, and after printing.

In addition, the printing device and the printing method are not limited to those producing merely meaningful visible images such as texts and figures with the ink. For example, the printing device and the printing method can produce patterns like geometric designs and 3D images.

In addition, the printing device includes both a serial type device in which the liquid discharging head is caused to move and a line type device in which the liquid discharging head is not moved, unless otherwise specified.

Furthermore, in addition to the desktop type, this printing device includes a wide type capable of printing images on a large print medium such as A0, a continuous printer capable of using continuous paper wound up in a roll form as print media.

Figure 2:
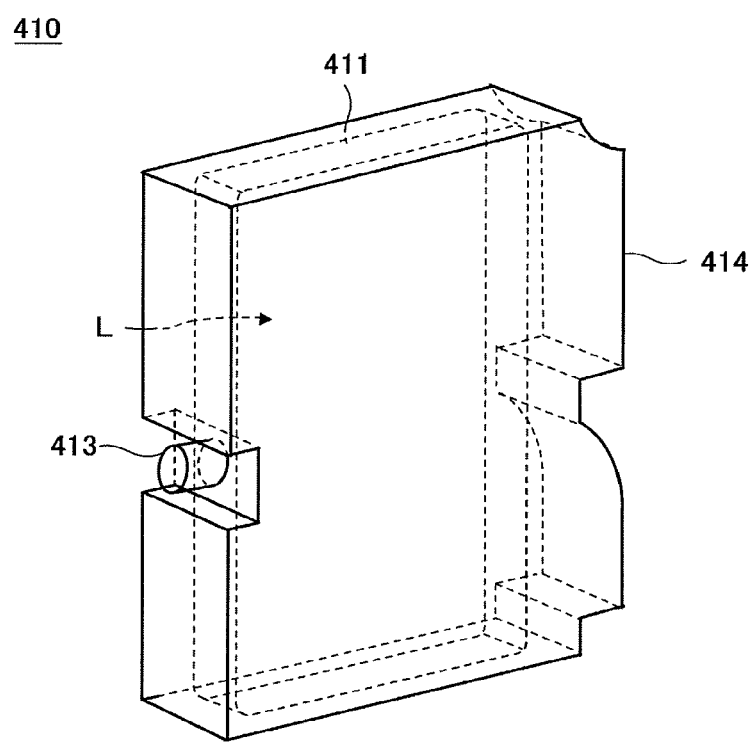
FIG. 2 is a perspective diagram illustrating one example of a main tank of the apparatus of FIG. 1.

The printing device is described using an example with reference to FIG. 1 and FIG. 2. FIG. 1 is a perspective view illustrating the image printing device. FIG. 2 is a perspective view illustrating the main tank. An image forming apparatus 400 as an example of the printing device is a serial type image forming apparatus. A mechanical unit 420 is disposed in an exterior 401 of the image forming apparatus 400. Each ink accommodating unit (ink container) 411 of each main tank 410 (410$k$, 410$c$, 410$m$, and 410$y$) for each color of black (K), cyan (C), magenta (M), and yellow (Y) is made of a packing member such as aluminum laminate film. The ink container 411 is accommodated in a plastic housing unit 414. As a result, the main tank 410 is used as an ink cartridge of each color.

A cartridge holder 404 is disposed on the rear side of the opening when a cover 401$c$ is opened. The cartridge holder 404 is detachably attached to the main tank 410. As a result, each ink discharging outlet 413 of the main tank 410 is communicated with a discharging head 434 for each color via a supplying tube 436 for each color so that the ink can be discharged from the discharging head 434 to a print medium.

EXAMPLES

The present disclosure will be described in more detail by way of the following Examples. However, the present disclosure should not be construed as being limited to these Examples.

Moreover, number average molecular weights (Mn) and weight average molecular weights (Mw) of copolymers obtained Examples and Comparative Examples were determined in the following manner.

<Measurements of Number Average Molecular Weight (Mn) and Weight Average Molecular Weight (Mw) of Copolymer>

The measurements were performed by gel permeation chromatography (GPC) under the following conditions.
Device: GPC-8020 (available from Tosoh Corporation)
Column: TSK G2000HXL and G4000HXL (available from Tosoh Corporation)
Temperature: 40° C.
Solvent: tetrahydrofuran (THF)
Flow rate: 1.0 mL/min A THF solution of each copolymer having a concentration of 0.5% by mass was injected in an amount of 1 mL to measure an average molecular weight distribution of the copolymer under the conditions above. A number average molecular weight (Mn) and a weight average molecular weight (Mw) of the copolymer were calculated from the average molecular weight distribution using a molecular weight calibration curve prepared from monodisperse polystyrene standard samples.

<Identification of Copolymer>

Each copolymer was identified using an IR spectrum. The IR spectrum was obtained by means of FT-IR Spectrum GX (available from PerkinElmer Inc.).

(Synthesis of Copolymer)

Example 1

Synthesis Example 1 of Copolymer CP-1

In 700 mL of methylene chloride, 62.0 g (525 mmol) of 1,6-hexanediol (available from Tokyo Chemical Industry Co., Ltd.) was dissolved. To the resultant solution, 20.7 g (262 mmol) of pyridine was added to prepare a solution.

To the resultant solution, a solution prepared by dissolving 50.0 g (262 mmol) of 2-naphthalenecarbonyl chloride (available from Tokyo Chemical Industry Co., Ltd.) in 100 mL of methylene chloride was added by dripping with stirring over 2 hours, followed by stirring the resultant mixture for 6 hours at room temperature, to thereby obtain a reaction solution. After washing the obtained reaction solution with water, an organic phase was separated, the organic phase was then dried with magnesium sulfate, and the solvent was distilled away to obtain a residue. The obtained residue was purified by silica gel column chromatography using a methylene chloride/methanol (volume ratio: 98/2) mixed solvent as an eluent, to thereby obtain 52.5 g of 2-naphthoic acid-6-hydroxyhexyl ester.

Next, 42.1 g (155 mmol) of the obtained 2-naphthoic acid-6-hydroxyhexyl ester was dissolved in 80 mL of dehydrated methyl ethyl ketone, and the resultant was heated to 60° C. to obtain a solution. To the resultant solution, a solution prepared by dissolving 24.0 g (155 mmol) of 2-methacryloyloxyethyl isocyanate (product name: KARENZ MOI, available from SHOWA DENKO K.K.) in 20 mL of dehydrated methyl ethyl ketone was added by dripping over 1 hour with stirring, followed by stirring the resultant mixture for 12 hours at 70° C. The resultant was cooled to room temperature, followed by distilling the solvent away to obtain a residue. The obtained residue was purified by silica gel column chromatography using a methylene chloride/methanol (volume ratio: 99/1) mixed solvent as an eluent, to thereby obtain 57.0 g of [Monomer M-1] represented by Structural Formula (1) below.

[Monomer M-1]

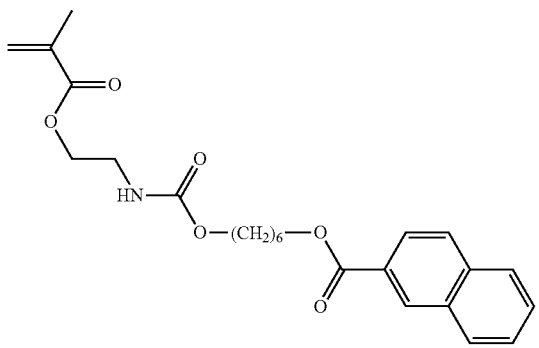

Structural Formula (1)

[Monomer M-2]

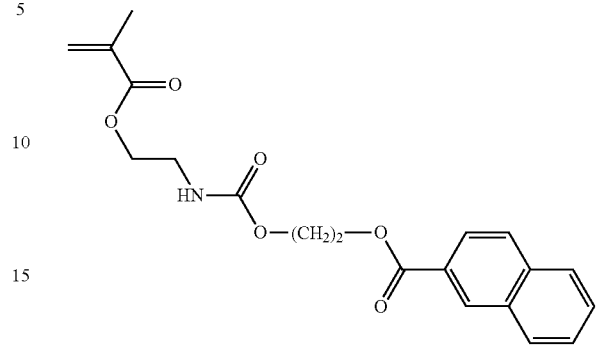

Structural Formula (2)

Next, 2.00 g (10.8 mmol) of 6-acrylamidehexanoic acid (available from Tokyo Chemical Industry Co., Ltd.) and 3.08 g (7.2 mmol) of [Monomer M-1] were dissolved in 40 mL of methyl ethyl ketone (may be referred to as "MEK" hereinafter) to thereby obtain a monomer solution. After heating 10% by mass of the obtained monomer solution to 75° C. under a flow of argon gas, a solution prepared by dissolving 0.15 g (0.90 mmol) of 2,2'-azoiso(butyronitrile) (may be referred to as "AIBN" hereinafter, available from Tokyo Chemical Industry Co., Ltd.) in the rest of the monomer solution was added by dripping over 1.5 hours and the resultant mixture was stirred for 4 hours at 75° C. The resultant was cooled to room temperature to obtain a reaction solution. To the obtained reaction solution, hexane was added. The precipitated copolymer was separated through filtration and dried under the reduced pressure to thereby obtain 4.95 g of [Copolymer CP-1] (weight average molecular weight (Mw): 12,000, number average molecular weight (Mn): 4,600). Next, 2.00 g of [Copolymer CP-1] was dissolved in a tetraethyl ammonium hydroxide aqueous solution in a manner that a solid content of the resultant solution was to be 2.38% by mass and pH of the resultant solution was to be 8.0, to thereby prepare an aqueous solution of [Copolymer CP-1] for dispersing pigment.

Figure 3:
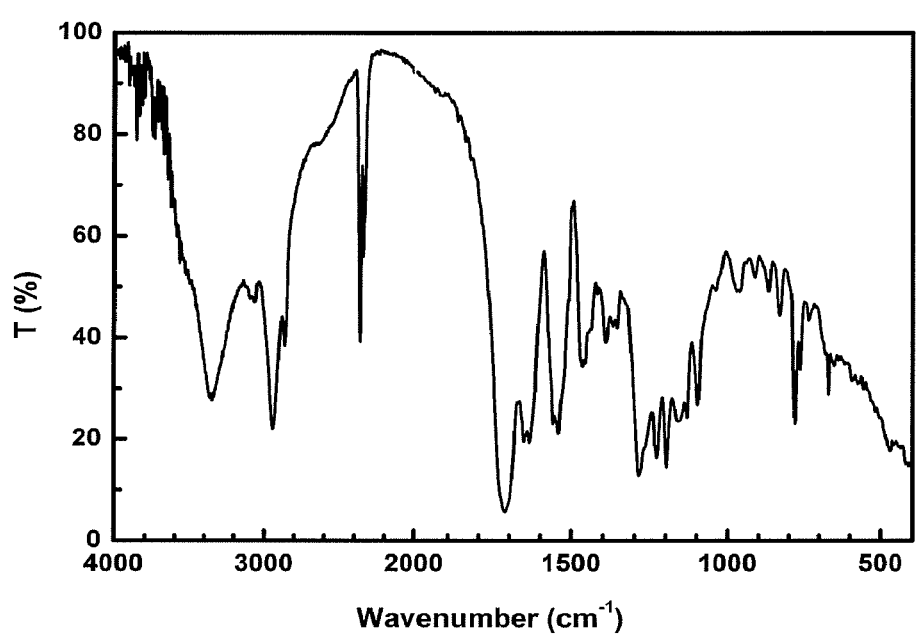
FIG. 3 is a chart depicting IR spectrum of [Copolymer CP-1] obtained in Example 1.

An IR spectrum of [Copolymer CP-1] obtained is presented in FIG. 3. A molar ratio of a structural unit represented by General Formula (1) of [Copolymer CP-1] obtained to the structural unit represented by General Formula (2) of [Copolymer CP-1] obtained (the structural unit represented by General Formula (1):the structural unit represented by General Formula (2)) was 1.5:1.

Example 2

Synthesis Example 2 of Copolymer CP-2

[Monomer M-2] represented by Structural Formula (2) below was obtained in the same manner as in Example 1, except that instead of 6-hexanediol, ethylene glycol (available from Tokyo Chemical Industry Co., Ltd.) was used.

Next, 4.90 g of [Copolymer CP-2] (weight average molecular weight (Mw): 9,800, number average molecular weight (Mn): 3,400) was obtained in the same manner as in Example 1, except that 2.00 g (10.8 mmol) of the 6-acrylamidehexanoic acid and 3.08 g (7.2 mmol) of [Monomer M-1] were replaced with 1.68 g (9.1 mmol) of 6-acrylamidehexanoic acid and 3.37 g (9.1 mmol) of [Monomer M-2]. An aqueous solution of [Copolymer CP-2] for dispersing a pigment was prepared in the same manner as in Example 1, except that [Copolymer CP-1] was replaced with [Copolymer CP-2].

An IR spectrum of [Copolymer CP-2] obtained was similar to the IR spectrum of [Copolymer CP-1]. A molar ratio of a structural unit represented by General Formula (1) of [Copolymer CP-2] obtained to the structural unit represented by General Formula (2) of [Copolymer CP-2] obtained (the structural unit represented by General Formula (1):the structural unit represented by General Formula (2)) was 1:1.

Example 3

Synthesis Example 3 of Copolymer CP-3

[Monomer M-3] represented by Structural Formula (3) below was obtained in the same manner as in Example 1, except that instead of 6-hexanediol, 1,16-hexadecanediol (available from Tokyo Chemical Industry Co., Ltd.) was used.

[Monomer M-3]

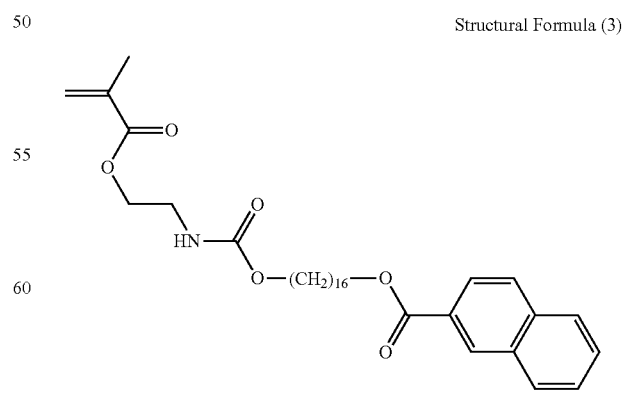

Structural Formula (3)

Next, 4.88 g of [Copolymer CP-3] (weight average molecular weight (Mw): 14,000, number average molecular weight (Mn): 4,500) was obtained in the same manner as in Example 1, except that 2.00 g (10.8 mmol) of the 6-acrylamidehexanoic acid, 3.08 g (7.2 mmol) of [Monomer M-1], and 0.15 g (0.90 mmol) of the AIBN were replaced with 1.25 g (6.8 mmol) of 6-acrylamidehexanoic acid, 3.83 g (6.8 mmol) of [Monomer M-3], and 0.11 g (0.67 mmol) of AIBN. An aqueous solution of Copolymer CP-3 for dispersing a pigment was prepared in the same manner as in Example 1, except that [Copolymer CP-1] was replaced with [Copolymer CP-3].

An IR spectrum of [Copolymer CP-3] obtained was similar to the IR spectrum of [Copolymer CP-1]. A molar ratio of a structural unit represented by General Formula (1) of [Copolymer CP-3] obtained to the structural unit represented by General Formula (2) of [Copolymer CP-3] obtained (the structural unit represented by General Formula (1):the structural unit represented by General Formula (2)) was 1:1.

Example 4

Synthesis Example 4 of Copolymer CP-4

In 30 mL of methylene chloride, 9.75 g (109.4 mmol) of 3-aminopropionic acid (available from Tokyo Chemical Industry Co., Ltd.) was dissolved. To the resultant solution, 11.07 g of trimethylamine (available from Tokyo Chemical Industry Co., Ltd.) was added to obtain a solution. To the obtained solution, a solution prepared by dissolving 10.40 g (99.5 mmol) of methacrylic acid chloride (available from Tokyo Chemical Industry Co., Ltd.) in 10 mL of methylene chloride was slowly dripped, followed by stirring the resultant mixture for 6 hours at room temperature. After washing the resultant with water, the solvent was distilled away to obtain a residue. The obtained residue was purified by silica gel column chromatography using a methylene chloride/methanol (volume ratio: 99/1) mixed solvent as an eluent, to thereby obtain 12.3 g of 3-acrylamidepropionic acid.

Next, [Monomer M-4] represented by Structural Formula (4) below was obtained in the same manner as in Example 1 using the 2-naphthoic acid-6-hydroxyhexyl ester obtained in Example 1 and 2-acryloyloxyethyl isocyanate (product name: KARENZ AOI, available from SHOWA DENKO K.K.).

[Monomer M-4]

Structural Formula (4)

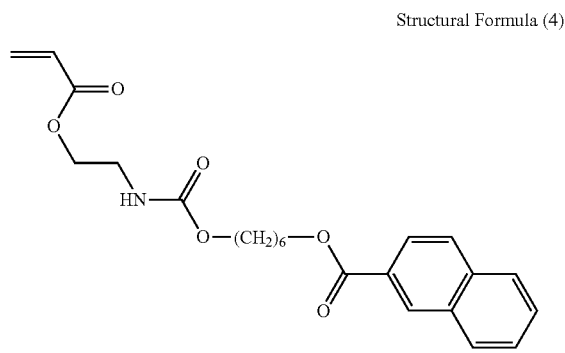

Next, 4.91 g of [Copolymer CP-4] (weight average molecular weight (Mw): 11,000, number average molecular weight (Mn): 4,700) was obtained in the same manner as in Example 1, except that 2.00 g (10.8 mmol) of the 6-acrylamidehexanoic acid and 3.08 g (7.2 mmol) of [Monomer M-1] were replaced with 1.40 g (8.9 mmol) of 3-acrylamidepropionic acid and 3.68 g (8.9 mmol) of [Monomer M-4]. An aqueous solution of [Copolymer CP-4] for dispersing a pigment was prepared in the same manner as in Example 1, except that [Copolymer CP-1] was replaced with [Copolymer CP-4].

An IR spectrum of [Copolymer CP-4] obtained was similar to the IR spectrum of [Copolymer CP-1]. A molar ratio of a structural unit represented by General Formula (1) of [Copolymer CP-4] obtained to the structural unit represented by General Formula (2) of [Copolymer CP-4] obtained (the structural unit represented by General Formula (1):the structural unit represented by General Formula (2)) was 1:1.

Example 5

Synthesis Example 5 of Copolymer CP-5

[Copolymer CP-5] (weight average molecular weight (Mw):10,500, number average molecular weight (Mn): 4,000) in an amount of 4.82 g was obtained in the same manner as in Example 1, except that 2.00 g (10.8 mmol) of 6-acrylamidehexanoic acid, 3.08 g (7.2 mmol) of [Monomer M-1], and 0.15 g (0.90 mmol) of AIBN were replaced with 0.90 g (4.9 mmol) of 6-acrylamidehexanoic acid, 4.15 g (9.7 mmol) of [Monomer M-1], and 0.13 g (0.78 mmol) of AIBN. An aqueous solution of [Copolymer CP-5] for dispersing a pigment was prepared in the same manner as in Example 1, except that [Copolymer CP-1] was replaced with [Copolymer CP-5].

An IR spectrum of [Copolymer CP-5] obtained was similar to the IR spectrum of [Copolymer CP-1]. A molar ratio of a structural unit represented by General Formula (1) of [Copolymer CP-5] obtained to the structural unit represented by General Formula (2) of [Copolymer CP-5] obtained (the structural unit represented by General Formula (1):the structural unit represented by General Formula (2)) was 0.5:1.

Example 6

Synthesis Example 6 of Copolymer CP-6

[Copolymer CP-6] (weight average molecular weight (Mw): 9,500, number average molecular weight (Mn): 3,300) in an amount of 4.85 g was obtained in the same manner as in Example 1, except that 2.00 g (10.8 mmol) of 6-acrylamidehexanoic acid, 3.08 g (7.2 mmol) of [Monomer M-1], and 0.15 g (0.90 mmol) of AIBN were replaced with 2.85 g (15.4 mmol) of 6-acrylamidehexanoic acid, 2.19 g (5.1 mmol) of [Monomer M-1], and 0.17 g (1.03 mmol) of AIBN. An aqueous solution of [Copolymer CP-6] for dispersing a pigment was prepared in the same manner as in Example 1, except that [Copolymer CP-1] was replaced with [Copolymer CP-6].

An IR spectrum of [Copolymer CP-6] obtained was similar to the IR spectrum of [Copolymer CP-1]. A molar ratio of a structural unit represented by General Formula (1) of [Copolymer CP-6] obtained to the structural unit represented by General Formula (2) of [Copolymer CP-6] obtained (the structural unit represented by General Formula (1):the structural unit represented by General Formula (2)) was 3:1.

Example 7

Synthesis Example 7 of Copolymer CP-7

[Copolymer CP-7] (weight average molecular weight (Mw): 9,000, number average molecular weight (Mn):3,200) in an amount of 4.91 g was obtained in the same manner as in Example 1, except that 2.00 g (10.8 mmol) of 6-acrylamidehexanoic acid, 3.08 g (7.2 mmol) of [Monomer M-1], and 0.15 g (0.90 mmol) of AIBN were replaced with 3.45 g (18.6 mmol) of 6-acrylamidehexanoic acid, 1.59 g (3.7 mmol) of [Monomer M-1], and 0.18 g (1.12 mmol) of AIBN. An aqueous solution of [Copolymer CP-7] for dispersing a pigment was prepared in the same manner as in Example 1, except that [Copolymer CP-1] was replaced with [Copolymer CP-7].

An IR spectrum of [Copolymer CP-7] obtained was similar to the IR spectrum of [Copolymer CP-1]. A molar ratio of a structural unit represented by General Formula (1) of [Copolymer CP-7] obtained to the structural unit represented by General Formula (2) of [Copolymer CP-7] obtained (the structural unit represented by General Formula (1):the structural unit represented by General Formula (2)) was 5:1.

Example 8

Synthesis Example 8 of Copolymer CP-8

In a sodium hydroxide aqueous solution, 2.00 g of [Copolymer CP-1] (weight average molecular weight (Mw): 12,000, number average molecular weight (Mn): 4,600) was dissolved in a manner that a concentration of the copolymer was to be 2.38% by mass, and pH of the resultant solution was to be 8.0, to thereby prepare an aqueous solution of [Copolymer CP-8] for dispersing a pigment.

An IR spectrum of [Copolymer CP-8] obtained was similar to the IR spectrum of [Copolymer CP-1]. A molar ratio of a structural unit represented by General Formula (1) of [Copolymer CP-8] obtained to the structural unit represented by General Formula (2) of [Copolymer CP-8] obtained (the structural unit represented by General Formula (1):the structural unit represented by General Formula (2)) was 1.5:1.

Example 9

Synthesis Example 9 of Copolymer CP-9

In 5.19 g (28.0 mmol) of 6-acrylamidehexanoic acid, 59.8 g (140 mmol) of [Monomer M-1] was dissolved. To the resultant solution, 100 g of ion-exchanged water, 3.00 g of Aqualon KH-10 (anionic radical reactive surfactant, available from DKS Co., Ltd.), and 1.00 g of ammonium persulfate were added. The resultant mixture was mixed by a homomixer to prepare a pre-emulsion. Subsequently, 2.00 g of Aqualon KH-10 (anionic radical reactive surfactant, available from DKS Co., Ltd.) was added to 100 g of ion-exchanged water, and the resultant mixture was heated to 80° C. under a flow of argon gas, followed by adding part of the pre-emulsion in the proportion of 10% by mass relative to a total of the pre-emulsion to perform initial polymerization for 30 minutes. Subsequently, the rest of the pre-emulsion was added to the resultant by dripping over 2 hours to perform polymerization, followed by further performing polymerization for 2 hours at 80° C. After cooling the resultant, the resultant was filtered and then neutralized with ammonia water to thereby an O/W emulsion of [Copolymer CP-9] (weight average molecular weight (Mw): 32,000, number average molecular weight (Mn): 10,700) for adding having a solid content of 30% by mass.

An IR spectrum of [Copolymer CP-9] obtained was similar to the IR spectrum of [Copolymer CP-1]. A molar ratio of a structural unit represented by General Formula (1) of [Copolymer CP-9] obtained to the structural unit represented by General Formula (2) of [Copolymer CP-9] obtained (the structural unit represented by General Formula (1):the structural unit represented by General Formula (2)) was 0.2:1.

Example 10

Synthesis Example 10 of Copolymer CP-10

In 11.11 g (60.0 mmol) of 6-acrylamidehexanoic acid, 64.1 g (150 mmol) of [Monomer M-1] was dissolved. To the resultant solution, 130 g of ion-exchanged water, 4.00 g of Aqualon KH-10 (anionic radical reactive surfactant, available from DKS Co., Ltd.), and 1.30 g of ammonium persulfate were added. The resultant mixture was mixed by a homomixer to prepare a pre-emulsion. Subsequently, 2.00 g of Aqualon KH-10 (anionic radical reactive surfactant, available from DKS Co., Ltd.) was added to 100 g of ion-exchanged water, and the resultant mixture was heated to 80° C. under a flow of argon gas, followed by adding part of the pre-emulsion in the proportion of 10% by mass relative to a total of the pre-emulsion to perform initial polymerization for 30 minutes. Subsequently, the rest of the pre-emulsion was added to the resultant by dripping over 2 hours to perform polymerization, followed by further performing polymerization for 2 hours at 80° C. After cooling the resultant, the resultant was filtered and then neutralized with ammonia water to thereby an O/W emulsion of [Copolymer CP-10] (weight average molecular weight (Mw): 29,000, number average molecular weight (Mn): 9,800) for adding having a solid content of 30% by mass. An IR spectrum of [Copolymer CP-10] obtained was similar to the IR spectrum of [Copolymer CP-1].

A molar ratio of a structural unit represented by General Formula (1) of [Copolymer CP-10] obtained to the structural unit represented by General Formula (2) of [Copolymer CP-10] obtained (the structural unit represented by General Formula (1):the structural unit represented by General Formula (2)) was 0.4:1.

Comparative Example 1

Synthesis Example 1 of Comparative Copolymer RCP-1

A solution prepared by dissolving 10.73 g (105 mmol) of 1-hexanol in 30 mL of dehydrated methylene chloride was heated to 40° C. To the resultant solution, 15.51 g (100 mmol) of 2-acryloyloxyethyl isocyanate (product name: KARENZ MOI, available from SHOWA DENKO K.K.) was dripped over 30 minutes with stirring, followed by stirring the resultant mixture for 12 hours at 40° C. After cooling the resultant to room temperature, the solvent was distilled away to obtain a residue. The residue was purified by silica gel column chromatography using methylene chloride as an eluent to thereby obtain 23.20 g of [Monomer RM-1] represented by Structural Formula (5) below.

[Monomer RM-1]

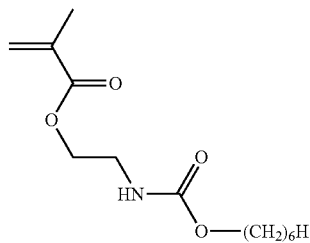

Structural Formula (5)

[Comparative Copolymer RCP-1] (weight average molecular weight (Mw): 7,500, number average molecular weight (Mn): 2,800) was obtained in the same manner as in Example 1, except that 2.00 g (10.8 mmol) of 6-acrylamidehexanoic acid and 3.08 g (7.2 mmol) of [Monomer M-1] were replaced with 0.78 g (10.8 mmol) of acrylic acid and 1.33 g (7.2 mmol) of [Monomer RM-1].

An aqueous solution of [Comparative Copolymer RCP-1] for dispersing a pigment was prepared in the same manner as in Example 1, except that [Copolymer CP-1] was replaced with [Comparative Copolymer RCP-1].

Comparative Example 2

Synthesis Example 2 of Comparative Pigment Dispersion RCP-2

A solution prepared by dissolving 80 g of 2-phenoxyethylmethacrylate serving as a monomer, 3.7 g of 3-mercapto-1-propanol serving as a chain-transfer agent, and 0.3 g of 2,2-azobis(2,4-dimethylvaleronitrile) serving as an initiator in 160 mL of THF was heated to 65° C. in a nitrogen atmosphere to allow to react for 7 hours. The obtained solution was allowed to cool. To the solution, 80 mg of dibutyltin(IV) dilaurate and a catalytic amount of hydroquinone were added. To the resultant mixture, 10.0 g of 2-methacryloyloxyethyl isocyanate was dripped. The resultant mixture was heated to 50° C. and allowed to react for 2.5 hours, followed by subjecting to purification through reprecipitation with a mixed solvent of methanol and water, to thereby obtain 71 g of [Micro Monomer MM-1] (weight average molecular weight (Mw): 4,000, number average molecular weight (Mn): 1,900).

Next, 20 g of methyl ethyl ketone was heated to 75° C. in a nitrogen atmosphere, followed by dripping a solution prepared by dissolving 1.16 g of dimethyl-2,2'-azobisisobutylate, 9 g of [Micro Monomer MM-1], 1.8 g of p-styrenesulfonic acid, and 49.2 g of methyl methacrylate in 40 g of methyl ethyl ketone over 3 hours. After completing the dripping, the resultant mixture was allowed to react further for 1 hour. To the resultant, thereafter, a solution prepared by dissolving 0.2 g of dimethyl-2,2'-azobisisobutylate in 0.6 g of methyl ethyl ketone was added, and the resultant was heated to 80° C. and heated and stirred for 4 hours. To the resultant, moreover, a solution prepared by dissolving 0.2 g of dimethyl-2,2'-azobisisobutylate in 0.6 g of methyl ethyl ketone was added, and the resultant mixture was heated and stirred for 6 hours. After cooling the resultant, the obtained reaction solution was added to hexane and the precipitated graft polymer was separated by filtration and dried to obtain [Comparative Copolymer RCP-2] (weight average molecular weight (Mw): 5,500, number average molecular weight (Mn): 2,200).

An aqueous solution of [Comparative Copolymer RCP-1] for dispersing a pigment was prepared in the same manner as in Example 1, except that [Copolymer CP-1] was replaced with [Comparative Copolymer RCP-2].

Comparative Example 3

Synthesis Example 3 of Comparative Copolymer RCP-3

[Comparative Copolymer RCP-3] (weight average molecular weight (Mw): 11,100, number average molecular weight (Mn): 6,800) was produced in the same manner as in Example 10, except that 3.08 g (7.2 mmol) of [Monomer M-1] was replaced with 1.85 g (7.2 mmol) of [Monomer RM-1] obtained in Comparative Example 1.

Compositions of the copolymers of Examples 1 to 10 are presented in Table 1 below.

TABLE 1

| | | Copolymer | General Formula (1):General Formula (2) (molar ratio) | $R_1$ | $L_1$ | X | $R_2$ | $L_2$ | Polymerization method | Weight average molecular weight (Mw) | Number average molecular weight (Mn) |
|---|---|---|---|---|---|---|---|---|---|---|---|
| Example | 1 | CP-1 | 1.5:1 | H | —$(CH_2)_5$— | TEA | $CH_3$ | —$(CH_2)_6$— | Solution polymerrization | 12,000 | 4,600 |
| | 2 | CP-2 | 1:1 | H | —$(CH_2)_5$— | TEA | $CH_3$ | —$(CH_2)_2$— | Solution polymerrization | 9,800 | 3,400 |
| | 3 | CP-3 | 1:1 | H | —$(CH_2)_5$— | TEA | $CH_3$ | —$(CH_2)_{16}$— | Solution polymerrization | 14,000 | 4,500 |
| | 4 | CP-4 | 1:1 | H | —$(CH_2)_2$— | TEA | H | —$(CH_2)_6$— | Solution polymerrization | 11,000 | 4,700 |
| | 5 | CP-5 | 0.5:1 | H | —$(CH_2)_5$— | TEA | $CH_3$ | —$(CH_2)_6$— | Solution polymerrization | 10,500 | 4,000 |
| | 6 | CP-6 | 3:1 | H | —$(CH_2)_5$— | TEA | $CH_3$ | —$(CH_2)_6$— | Solution polymerrization | 9,500 | 3,300 |
| | 7 | CP-7 | 5:1 | H | —$(CH_2)_5$— | TEA | $CH_3$ | —$(CH_2)_6$— | Solution polymerrization | 9,000 | 3,200 |
| | 8 | CP-8 | 1.5:1 | H | —$(CH_2)_5$— | $Na^+$ | $CH_3$ | —$(CH_2)_6$— | Solution polymerrization | 12,000 | 4,600 |
| | 9 | CP-9 | 0.2:1 | H | —$(CH_2)_5$— | $NH_4^+$ | $CH_3$ | —$(CH_2)_6$— | Emulsion polymerrization | 32,000 | 10,700 |

TABLE 1-continued

| Copolymer | General Formula (1):General Formula (2) (molar ratio) | $R_1$ | $L_1$ | X | $R_2$ | $L_2$ | Polymerization method | Weight average molecular weight (Mw) | Number average molecular weight (Mn) |
|---|---|---|---|---|---|---|---|---|---|
| 10 CP-10 | 0.4:1 | H | —$(CH_2)_5$— | $NH_4^+$ | $CH_3$ | —$(CH_2)_6$— | Emulsion polymerrization | 29,000 | 9,800 |

In Table 1 above, TEA denotes a tetraethyl ammonium.

(Production of Pigment Dispersion)

Example 11

Production Example 1 of Pigment Dispersion PD-1

To 84.0 parts by mass of the aqueous solution of [Copolymer CP-1] for dispersing pigment obtained in Example 1, 16.0 parts by mass of carbon black (product name: NIPEX150, available from Degussa) and the resultant was stirred for 12 hours to obtain a mixture. The obtained mixture was circulated and dispersed for 1 hour by a disk-type bead mill (KDL, available from SHINMARU ENTERPRISES CORPORATION, media: using zirconia balls each having a diameter of 0.1 mm) at rip speed of 10 m/s. Thereafter, the resultant was filtered with a membrane filter having an average pore size of 1.2 μm and a preparation amount of ion-exchanged water was added to thereby produce 95.0 parts by mass of [Pigment Dispersion PD-1] (pigment solid content: 16% by mass).

Example 12

Production Example 2 of Pigment Dispersion PD-2

[Pigment Dispersion PD-2] was produced in the same manner as in Example 11, except that the aqueous solution of [Copolymer CP-1] for dispersing a pigment was replaced with the aqueous solution of [Copolymer CP-2] for dispersing a pigment.

Example 13

Production Example 3 of Pigment Dispersion PD-3

[Pigment Dispersion PD-3] was produced in the same manner as in Example 11, except that the aqueous solution of [Copolymer CP-1] for dispersing a pigment was replaced with the aqueous solution of [Copolymer CP-3] for dispersing a pigment.

Example 14

Production Example 4 of Pigment Dispersion PD-4

[Pigment Dispersion PD-4] was produced in the same manner as in Example 11, except that the aqueous solution of [Copolymer CP-1] for dispersing a pigment was replaced with the aqueous solution of [Copolymer CP-4] for dispersing a pigment.

Example 15

Production Example 5 of Pigment Dispersion PD-5

[Pigment Dispersion PD-5] was produced in the same manner as in Example 11, except that the aqueous solution of [Copolymer CP-1] for dispersing a pigment was replaced with the aqueous solution of [Copolymer CP-5] for dispersing a pigment.

Example 16

Production Example 6 of Pigment Dispersion PD-6

[Pigment Dispersion PD-6] was produced in the same manner as in Example 11, except that the aqueous solution of [Copolymer CP-1] for dispersing a pigment was replaced with the aqueous solution of [Copolymer CP-6] for dispersing a pigment.

Example 17

Production Example 7 of Pigment Dispersion PD-7

[Pigment Dispersion PD-7] was produced in the same manner as in Example 11, except that the aqueous solution of [Copolymer CP-1] for dispersing a pigment was replaced with the aqueous solution of [Copolymer CP-7] for dispersing a pigment.

Example 18

Production Example 8 of Pigment Dispersion PD-8

[Pigment Dispersion PD-8] was produced in the same manner as in Example 11, except that the aqueous solution of [Copolymer CP-1] for dispersing a pigment was replaced with the aqueous solution of [Copolymer CP-8] for dispersing a pigment.

Example 19

Production Example 9 of Pigment Dispersion PD-9

[Pigment Dispersion PD-9] was produced in the same manner as in Example 11, except that the carbon black was replaced with a cyan pigment (Pigment Blue 15:3, product name: CHROMOFINE BLUE, available from Dainichiseika Color & Chemicals Mfg. Co., Ltd.) and the solid content was changed from 2.38% by mass to 20.0% by mass.

Example 20

Production Example 10 of Pigment Dispersion PD-10

[Pigment Dispersion PD-10] was produced in the same manner as in Example 11, except that the carbon black was replaced with a magenta pigment (Pigment Red 122, product name: Toner Magenta EO02, available from Clariant Japan K.K.) and the solid content was changed from 2.38% by mass to 20.0% by mass.

Example 21

Production Example 11 of Pigment Dispersion PD-11

[Pigment Dispersion PD-11] was produced in the same manner as in Example 11, except that the carbon black was replaced with a yellow pigment (Pigment Yellow, product name: Fast Yellow 531, available from Dainichiseika Color & Chemicals Mfg. Co., Ltd.) and the solid content was changed from 2.38% by mass to 20.0% by mass.

Comparative Example 4

Production Example 1 of Comparative Pigment Dispersion RPD-1

[Comparative Pigment Dispersion RPD-1] was produced in the same manner as in Example 11, except that the aqueous solution of [Copolymer CP-1] for dispersing a pigment was replaced with the aqueous solution of [Comparative Copolymer RCP-1] for dispersing a pigment.

Comparative Example 5

Production Example 2 of Comparative Pigment Dispersion RPD-2

[Comparative Pigment Dispersion RPD-2] was produced in the same manner as in Example 19, except that the aqueous solution of [Copolymer CP-1] for dispersing a pigment was replaced with the aqueous solution of [Comparative Copolymer RCP-1] for dispersing a pigment.

Comparative Example 6

Production Example 3 of Comparative Pigment Dispersion RPD-3

[Comparative Pigment Dispersion RPD-3] was produced in the same manner as in Example 20, except that the aqueous solution of [Copolymer CP-1] for dispersing a pigment was replaced with the aqueous solution of [Comparative Copolymer RCP-1] for dispersing a pigment.

Comparative Example 7

Production Example 4 of Comparative Pigment Dispersion RPD-4

[Comparative Pigment Dispersion RPD-4] was produced in the same manner as in Example 21, except that the aqueous solution of [Copolymer CP-1] for dispersing a pigment was replaced with the aqueous solution of [Comparative Copolymer RCP-1] for dispersing a pigment.

Comparative Example 8

Production Example 5 of Comparative Pigment Dispersion RPD-5

[Comparative Pigment Dispersion RPD-5] was produced in the same manner as in Example 11, except that [Copolymer CP-1] was replaced with [Comparative Copolymer RCP-2].

The pigment dispersions produced in Examples 11 to 21 and Comparative Examples 4 to 8 were subjected to an evaluation of "storage stability of the pigment dispersion" in the following manner. The results are presented in Table 2.

<Storage Stability of Pigment Dispersion>

A glass container was charged with each pigment dispersion and the resultant was stored for 2 weeks at 70° C. A changing rate of the viscosity of the pigment dispersion after the storage relative to the viscosity of the pigment dispersion before the storage was determined by a formula below, and "storage stability of the pigment dispersion" was evaluated based on the following evaluation criteria.

$$\text{Changing rate of viscosity}(\%) = \frac{\text{Viscosity of pigment dispersion after storage} - \text{Viscosity of pigment dispersion before storage}}{\text{Viscosity of pigment dispersion before storage}} \times 100$$

For a measurement of a viscosity, a viscosity at 25° C. was measured by means of a viscometer (product name: RE80L, available from TOKI SANGYO CO., LTD.) at 50 rpm.

—Evaluation Criteria—

A: The changing rate of the viscosity was within a range of ±5%.

B: The changing rate of the viscosity was greater than a range of ±5% but equal to or less than a range of ±8%.

C: The changing rate of the viscosity was greater than a range of ±8% but equal to or less than a range of ±10%.

D: The changing rate of the viscosity was greater than a range of ±10% but equal to or less than a range of ±30%.

E: The changing rate of the viscosity was greater than a range of ±30% (gelation occurred and it was impossible to evaluate).

TABLE 2

|  | | Pigment dispersion | Copolymer | Coloring material | Storage stability of pigment dispersion |
|---|---|---|---|---|---|
| Ex. | 11 | PD-1 | CP-1 | Carbon black | A |
|  | 12 | PD-2 | CP-2 | Carbon black | A |
|  | 13 | PD-3 | CP-3 | Carbon black | A |
|  | 14 | PD-4 | CP-4 | Carbon black | A |
|  | 15 | PD-5 | CP-5 | Carbon black | B |
|  | 16 | PD-6 | CP-6 | Carbon black | A |
|  | 17 | PD-7 | CP-7 | Carbon black | B |
|  | 18 | PD-8 | CP-8 | Carbon black | B |
|  | 19 | PD-9 | CP-1 | Cyan pigment | A |
|  | 20 | PD-10 | CP-1 | Magenta pigment | A |
|  | 21 | PD-11 | CP-1 | Yellow pigment | A |
| Comp. Ex. | 4 | RPD-1 | RCP-1 | Carbon black | C |
|  | 5 | RPD-2 | RCP-1 | Cyan pigment | C |
|  | 6 | RPD-3 | RCP-1 | Magenta pigment | C |
|  | 7 | RPD-4 | RCP-1 | Yellow pigment | C |
|  | 8 | RPD-5 | RCP-2 | Carbon black | C |

It was found from the results of Table 2 that the pigment dispersions of Example 11 to 21, each of which had been produced using a copolymer having a naphthyl group at a terminal of a side chain had excellent storage stability compared to the pigment dispersions of Comparative Examples 4 to 8, each of which used a copolymer having no naphthyl group at a terminal of a side chain. The reason for this is assumed that adsorption of the copolymer to the pigment was enhanced owing to the n-n interaction between the naphthyl group of the copolymer and the pigment.

(Production of Ink)

Example 22

Production Example 1 of Ink GJ-1

[Pigment Dispersion PD-1] in an amount of 45.0 parts by mass, 10.0 parts by mass of 1,3-butanediol, 10.0 parts by mass of glycerin, 10.0 parts by mass of 3-methoxy-N,N-dimethylpropionamide, 1.0 part by mass of Zonyl FS-300 (fluorine-based surfactant, available from DuPont, solid content: 40% by mass), and 24.0 parts by mass of ion-exchanged water were mixed, the resultant mixture was stirred for 1 hour, followed by filtering the mixture with a membrane filter having an average pore size of 1.2 μm to thereby produce [Ink GJ-1].

Example 23

Production Example 2 of Ink GJ-2

[Ink GJ-2] was produced in the same manner as in Example 22, except that [Pigment Dispersion PD-1] was replaced with [Pigment Dispersion PD-2].

Example 24

Production Example 3 of Ink GJ-3

[Ink GJ-3] was produced in the same manner as in Example 22, except that [Pigment Dispersion PD-1] was replaced with [Pigment Dispersion PD-3].

Example 25

Production Example 4 of Ink GJ-4

[Ink GJ-4] was produced in the same manner as in Example 22, except that [Pigment Dispersion PD-1] was replaced with [Pigment Dispersion PD-4].

Example 26

Production Example 5 of Ink GJ-5

[Ink GJ-5] was produced in the same manner as in Example 22, except that [Pigment Dispersion PD-1] was replaced with [Pigment Dispersion PD-5].

Example 27

Production Example 6 of Ink GJ-6

[Ink GJ-6] was produced in the same manner as in Example 22, except that [Pigment Dispersion PD-1] was replaced with [Pigment Dispersion PD-6].

Example 28

Production Example 7 of Ink GJ-7

[Ink GJ-7] was produced in the same manner as in Example 22, except that [Pigment Dispersion PD-1] was replaced with [Pigment Dispersion PD-7].

Example 29

Production Example 8 of Ink GJ-8

[Ink GJ-8] was produced in the same manner as in Example 22, except that [Pigment Dispersion PD-1] was replaced with [Pigment Dispersion PD-8].

Example 30

Production Example 9 of Ink GJ-9

[Pigment Dispersion PD-9] in an amount of 30.0 parts by mass, 15.0 parts by mass of 1,3-butanediol, 10.0 parts by mass of glycerin, 20.0 parts by mass of 3-methoxy-N,N-dimethylpropionamide, 1.0 part by mass of Zonyl FS-300 (fluorine-based surfactant, available from DuPont, solid content: 40% by mass), and 24.0 parts by mass of ion-exchanged water were mixed, and the resultant mixture was stirred for 1 hour, followed by filtering the mixture with a membrane filter having an average pore size of 1.2 μm, to thereby produce [Ink GJ-9].

Example 31

Production Example 10 of Ink GJ-10

[Ink GJ-10] was produced in the same manner as in Example 22, except that [Pigment Dispersion PD-1] was replaced with [Pigment Dispersion PD-10].

Example 32

Production Example 11 of Ink GJ-11

[Ink GJ-11] was produced in the same manner as in Example 30, except that [Pigment Dispersion PD-9] was replaced with [Pigment Dispersion PD-11].

Example 33

Production Example 12 of Ink GJ-12

Materials below were mixed and the resultant mixture was stirred for 30 minutes to prepare [Aqueous Solution 1].

| | |
|---|---|
| 2-Ethyl-1,3-hexanediol | 2.00 parts by mass |
| Glycerol | 10.00 parts by mass |
| 3-Methoxy-N,N-dimethylpropaneamide | 15.00 parts by mass |
| 3-Butoxy-N,N-dimethylpropaneamide | 15.00 parts by mass |
| 2-(Cyclohexylamino)ethanesulfonic acid | 0.05 parts by mass |
| 2,4,7,9-Tetramethyl-4,7-decanediol | 0.50 parts by mass |
| Zonyl FS-300 (fluorine-based surfactant, available from DuPont) | 0.25 parts by mass |
| Diethanol amine | 0.01 parts by mass |
| Ion-exchanged water | 12.93 parts by mass |

Subsequently, 50 g of dehydrated carbon black, 100 mL of ion-exchanged water, and 15.5 g (50 mmol) of a compound represented by Structural Formula (6) below were mixed and the resulting mixture was heated to 60° C. with stirring at 300 rpm. To the resultant, 50 mmol of a 20% by mass sodium nitrite aqueous solution was added over 15 minutes, and the resultant was stirred for 3 hours at 60° C. The resultant content was diluted with 75 mL of ion-exchanged water, followed by filtration. To the resultant, ion-exchanged water was added in a manner that a solid content was to be 20.0% by mass, to thereby obtain [Pigment Dispersion CB-K].

Structural Formula (6)

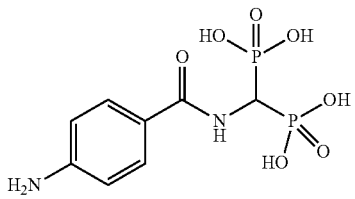

Next, 37.50 parts by mass of [Pigment Dispersion CB-K] was added to [Aqueous Solution 1] and the resultant mixture was stirred for 30 minutes. To the mixture, 6.67 parts by mass of [Copolymer CP-9] (solid content: 30% by mass) was further added, and the resultant mixture was stirred for 30 minutes. Next, the resultant was filtered with a membrane filter having an average pore size of 1.2 μm to thereby produce [Ink GJ-12].

Example 34

Production Example 13 of Ink GJ-13

Materials below were mixed and the resultant mixture was stirred for 30 minutes to prepare [Aqueous Solution 2].

| | |
|---|---|
| 2-Ethyl-1,3-hexanediol | 2.00 parts by mass |
| Glycerol | 10.00 parts by mass |
| 3-Methoxy-N,N-dimethylpropaneamide | 20.00 parts by mass |
| 3-Butoxy-N,N-dimethylpropaneamide | 20.00 parts by mass |
| 2-(Cyclohexylamino)ethanesulfonic acid | 0.05 parts by mass |
| 2,4,7,9-Tetramethyl-4,7-decanediol | 0.50 parts by mass |
| Zonyl FS-300 (fluorine-based surfactant, available from DuPont) | 0.25 parts by mass |
| Diethanol amine | 0.01 parts by mass |
| Ion-exchanged water | 17.93 parts by mass |

Subsequently, 4.50 g of p-aminobenzoic acid was added to 150 g of ion-exchanged water heated to 60° C. and the resultant mixture was mixed for 10 minutes at 8,000 rpm. To the mixture, a solution prepared by dissolving 1.80 g of sodium nitrite in 15 g of ion-exchanged water was added, followed by immediately adding 20 g of a copper phthalocyanine pigment PB 15:4 (available from SUNCHEMICAL CO., LTD.), and the resultant mixture was mixed for 1 hour at 8,500 rpm. To the resultant, a solution prepared by dissolving 4.5 g of p-aminobenzoic acid in 15 g of ion-exchanged water was further added, and the resultant mixture was mixed for 3 hours at 65° C. at 8,500 rpm. The mixed reaction mixture was filtered with a mesh of 200 nm, and washed with water. Thereafter, the obtained cyan pigment was dispersed in water. Coarse particles were removed by centrifuge separation, and ion-exchanged water was added to the resultant in a manner that a solid content was to be 20.0% by mass, to thereby obtain [Pigment Dispersion CB-C] subjected to a surface treatment with p-aminobenzoic acid.

Next, 22.50 parts by mass of [Pigment Dispersion CB-C] was added to [Aqueous Solution 2] and the resultant mixture was stirred for 30 minutes. To the resultant, 6.67 parts of [Copolymer CP-10] (solid content: 30% by mass) was further added and the resulting mixture was stirred for 30 minutes. Next, the resultant was filtered with a membrane filter having an average pore size of 1.2 μm to thereby produce [Ink GJ-13].

Example 35

Production Example 14 of Ink GJ-14

[Aqueous Solution 1] was prepared in the same manner as in Example 33. Subsequently, 4.50 g of sulfanilic acid was added to 150 g of ion-exchanged water heated to 60° C. and the resultant mixture was mixed for 10 minutes at 8,000 rpm. To the mixture, a solution prepared by dissolving 1.80 g of sodium nitrite in 15 g of ion-exchanged water was added, followed by adding 20 g of a magenta pigment PR122 (available from SUNCHEMICAL CO., LTD.). The resultant mixture was mixed for 1 hour at 8,500 rpm. To the resultant, a solution prepared by dissolving 4.5 g of sulfanilic acid in 15 g of ion-exchanged water was added and the resultant mixture was mixed for 3 hours at 65° C. at 8,500 rpm. The obtained reaction mixture was filtered with a mesh of 200 nm. After washing the resultant with water, the obtained magenta pigment was dispersed in water. Coarse particles were removed by centrifugal separation, and water was added to the resultant in a manner that a solid content was to be 20.0% by mass to thereby obtain [Pigment Dispersion CB-M] subjected to a surface treatment with sulfanilic acid.

Next, 37.50 parts by mass of [Pigment Dispersion CB-M] was added to [Aqueous Solution 1] and the resultant mixture was stirred for 30 minutes. To the resultant, 6.67 parts by mass of [Copolymer CP-10] (solid content: 30% by mass) was further added and the resultant mixture was stirred for 30 minutes. Next, the resultant was filtered with a membrane filter having an average pore size of 1.2 μm to thereby produce [Ink GJ-14].

Example 36

Production Example 15 of Ink GJ-15

[Ink GJ-15] was produced in the same manner as in Example 34, except that [Pigment Dispersion CB-C] was replaced with [Pigment Dispersion PD-9].

Comparative Example 9

Production Example 1 of Comparative Ink RGJ-1

[Comparative Ink RGJ-1] was produced in the same manner as in Example 22, except that [Pigment Dispersion PD-1] was replaced with [Comparative Pigment Dispersion RPD-1].

Comparative Example 10

Production Example 2 of Comparative Ink RGJ-2

[Comparative Ink RGJ-2] was produced in the same manner as in Example 30, except that [Pigment Dispersion PD-9] was replaced with [Comparative Pigment Dispersion RPD-2].

Comparative Example 11

Production Example 3 of Comparative Ink RGJ-3

[Comparative Ink RGJ-3] was produced in the same manner as in Example 31, except that [Pigment Dispersion PD-10] was replaced with [Comparative Pigment Dispersion RPD-3].

Comparative Example 12

Production Example 4 of Comparative Ink RGJ-4

[Comparative Ink RGJ-4] was produced in the same manner as in Example 32, except that [Pigment Dispersion PD-11] was replaced with [Comparative Pigment Dispersion RPD-4].

Comparative Example 13

Production Example 5 of Comparative Ink RGJ-5

[Comparative Ink RGJ-5] was produced in the same manner as in Example 22, except that [Pigment Dispersion PD-1] was replaced with [Comparative Pigment Dispersion RPD-5].

Comparative Example 14

Production Example 6 of Comparative Ink RGJ-6

[Comparative Ink RGJ-6] was produced in the same manner as in Example 34, except that [Copolymer CP-10] was replaced with [Comparative Copolymer RCP-3].

Comparative Example 15

Production Example 7 of Comparative Ink RGJ-7

[Comparative Ink RGJ-7] was produced in the same manner as in Example 35, except that [Copolymer CP-10] was replaced with [Comparative Copolymer RCP-3].

Comparative Example 16

Production Example 8 of Comparative Ink RGJ-8

Comparative Ink RGJ-8 was obtained in the same manner as in Example 38, except that [Pigment Dispersion PD-9] and [Copolymer CP-10] were replaced with [Comparative Pigment Dispersion RPD-2] and [Comparative Copolymer RCP-3].

The inks produced in Examples 22 to 36 and Comparative Examples 9 to 16 were subjected to evaluations of "storage stability of ink," "image density," and "prevention of beading" in the following manner. The results are presented in Table 3.

<Storage Stability of Ink>

An ink-stored container (ink cartridge) was charged with each ink and stored for 1 week at 70° C. A changing rate of the viscosity of the ink after the storage relative to the viscosity of the ink before the storage was determined by a formula below, and "storage stability of the ink" was evaluated based on evaluation criteria below.

$$\text{Changing rate of viscosity}(\%) = \frac{\text{Viscosity of ink after storage} - \text{Viscosity of ink before storage}}{\text{Viscosity of ink before storage}} \times 100$$

For a measurement of a viscosity, a viscosity at 25° C. was measured by means of a viscometer (product name: RE80L, available from TOKI SANGYO CO., LTD.) at 50 rpm.

—Evaluation Criteria—

A: The changing rate of the viscosity was within a range of ±5%.
B: The changing rate of the viscosity was greater than a range of ±5% but equal to or less than a range of ±8%.
C: The changing rate of the viscosity was greater than a range of ±8% bur equal to or less than a range of ±10%.
D: The changing rate of the viscosity was greater than a range of ±10% but equal to or less than a range of ±30%.
E: The changing rate of the viscosity was greater than a range of ±30% (gelation occurred and it was impossible to evaluate).

<Image Density>

An inkjet printer (product name: IPSiO GX5000, available from Ricoh Company Limited) was loaded with each ink, and a chart including a general symbol of JIS X 0208 (1997), 2223 with 64 point created by a product name, Microsoft Word 2000 (available from Microsoft) was printed on Plain Paper 1 (product name: XEROX4200, available from XEROX CORPORATION) and Plain Paper 2 (product name: MyPaper, available from Ricoh Company Limited) in an environment of 23° C. and 50% RH. The color of the part of the general symbol on the printed surface was measured by means of a product name, X-Rite938 (available from X-Rite Inc.) to measure an OD value, and "image density" was evaluated based on the following evaluation criteria.

As the printing mode, a mode modified to "no color correction" from the "plain paper-standard fast speed" mode in the user setting of plain paper using a driver attached to the printer was used.

Note that, JIS X 0208 (1997), 2223 is a symbol that has an outer shape of a square an entire area of which is filled in with the ink.

—Evaluation Criteria—

A: The OD value was 1.25 or greater.
B: The OD value was 1.20 or greater but less than 1.25.
C: The OD value was 1.10 or greater but less than 1.20.
D: The OD value was less than 1.10.
E: The pigment caused gelation and was not able to be dispersed in the ink, hence printing was unable to be performed.

<Prevention of Beading>

The general symbol of JIS X 0208(1997), 2223 was printed in the same manners as in the evaluation of the image density, except that a printing sheet LumiArt Gloss 90GSM (registered trademark) (available from Stora Enso) was used as the print medium, and the printing mode was changed to the "gloss paper-fast" mode. Thereafter, the printed image was visually observed and "prevention of beading" was evaluated based on the following evaluation criteria.

—Evaluation Criteria—

A: The beading did not occur at all or the beading occurred in the area that was less than 10% relative to the entire image.
B: The beading occurred in the area that was 10% or greater but less than 20% relative to the entire image.

C: The beading occurred in the area that was 20% or greater but less than 40% relative to the entire image.
D: The beading occurred in the area that was 40% or greater but less than 90% relative to the entire image.
E: The beading occurred in the area that was 90% or greater relative to the entire image.
F: The pigment caused gelation, thus the pigment was not be able to be dispersed in the ink and printing was not be able to be performed.

The inks of Examples 33 to 35, each of which was produced by adding the emulsion including the copolymer having a naphthyl group at a terminal of a side chain, were excellent, particularly in terms of the prevention of beading, compared to the inks of Comparative Examples 14 and 15, each of which was produced by adding the emulsion including the copolymer having no naphthyl group at a terminal of a side chain. The reason for this is assumed that the pigment is immediately aggregated on a surface of a printing medium

TABLE 3

|  |  | Ink | Pigment dispersion | Copolymer | Using method | Storage stability of ink | Image density Plain Paper 1 | Image density Plain Paper 2 | Prevention of beading |
|---|---|---|---|---|---|---|---|---|---|
| Example | 22 | GJ-1 | PD-1 | CP-1 | Pigment dispersion | A | A | A | A |
|  | 23 | GJ-2 | PD-2 | CP-2 | Pigment dispersion | A | A | A | B |
|  | 24 | GJ-3 | PD-3 | CP-3 | Pigment dispersion | B | A | A | B |
|  | 25 | GJ-4 | PD-4 | CP-4 | Pigment, dispersion | B | A | A | B |
|  | 26 | GJ-5 | PD-5 | CP-5 | Pigment dispersion | C | A | A | B |
|  | 27 | GJ-6 | PD-6 | CP-6 | Pigment dispersion | A | A | A | B |
|  | 28 | GJ-7 | PD-7 | CP-7 | Pigment dispersion | C | A | A | B |
|  | 29 | GJ-8 | PD-8 | CP-8 | Pigment dispersion | A | A | A | B |
|  | 30 | GJ-9 | PD-9 | CP-1 | Pigment dispersion | A | A | A | B |
|  | 31 | GJ-10 | PD-10 | CP-1 | Pigment dispersion | B | A | A | B |
|  | 32 | GJ-11 | PD-11 | CP-1 | Pigment dispersion | A | A | A | B |
|  | 33 | GJ-12 | CB-K | CP-9 | Addition | A | A | A | A |
|  | 34 | GJ-13 | CB-C | CP-10 | Addition | A | A | A | A |
|  | 35 | GJ-14 | CB-M | CP-10 | Addition | B | A | A | A |
|  | 36 | GJ-15 | PD-9 | CP-1 CP-10 | Pigment dispersion Addition | A | A | A | A |
| Comparative Example | 9 | RGJ-1 | RPD-1 | RCP-1 | Pigment dispersion | D | C | D | B |
|  | 10 | RGJ-2 | RPD-2 | RCP-1 | Pigment dispersion | D | D | D | D |
|  | 11 | RGJ-3 | RPD-3 | RCP-1 | Pigment dispersion | D | D | D | D |
|  | 12 | RGJ-4 | RPD-4 | RCP-1 | Pigment dispersion | D | D | D | D |
|  | 13 | RGJ-5 | RPD-5 | RCP-2 | Pigment dispersion | E | C | D | F |
|  | 14 | RGJ-6 | CB-C | RCP-3 | Addition | D | C | C | C |
|  | 15 | RGJ-7 | CB-M | RCP-3 | Addition | E | C | C | C |
|  | 16 | RGJ-8 | RPD-2 | RCP-1 RCP-3 | Pigment dispersion Addition | E | E | E | F |

The inks of Examples 22 to 32 and Example 36, each of which was produced using the dispersion including the copolymer having a naphthyl group at a terminal of a side chain, exhibited high storage stability and had excellent properties in terms of the image density and the prevention of beading compared to the inks of Comparative Examples 9 to 13 and Comparative Example 16, each of which was producing using the dispersion including the copolymer having no naphthyl group at a terminal of a side chain adsorbed on a surface of a pigment.

at the time of printing owing to the π-π stacking between the naphthyl group present in the emulsion and the pigment in the ink and hence the beading can be prevented.

For example, embodiments of the present disclosure are as follows.

<1> A copolymer including:
a structural unit represented by General Formula (1) below; and a structural unit represented by General Formula (2) below,

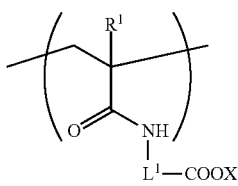

General Formula (1)

where, in General Formula (1), $R^1$ is a hydrogen atom or a methyl group, $L^1$ is an alkylene group having 2 or greater carbon atoms but 5 or less carbon atoms, and X is a hydrogen atom or a cation,

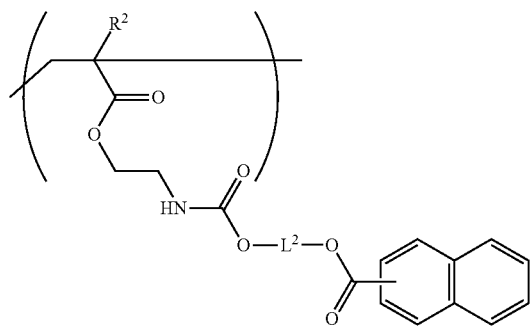

General Formula (2)

where, in General Formula (2), $R^2$ is a hydrogen atom or a methyl group and $L^2$ is an alkylene group having 2 or greater carbon atoms but 18 or less carbon atoms.

<2> The copolymer according to <1>,
wherein a molar ratio of the structural unit represented by General Formula (1) to the structural unit represented by General Formula (2) (the structural unit represented by General Formula (1):the structural unit represented by General Formula (2)) is from 0.5:1 through 3:1.

<3> The copolymer according to <1> or <2>,
wherein, in the structural unit represented by General Formula (2), $L^2$ is an alkylene group having 2 or greater carbon atoms but 12 or less carbon atoms.

<4> The copolymer according to any one of <1> to <3>,
wherein the copolymer is formed by polymerizing a compound represented by General Formula (3) and a compound represented by General Formula (4),

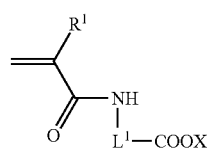

General Formula (3)

where, in General Formula (3), $R^1$ is a hydrogen atom or a methyl group, $L^1$ is an alkylene group having 2 or greater carbon atoms but 5 or less carbon atoms, and X is a hydrogen atom or a cation,

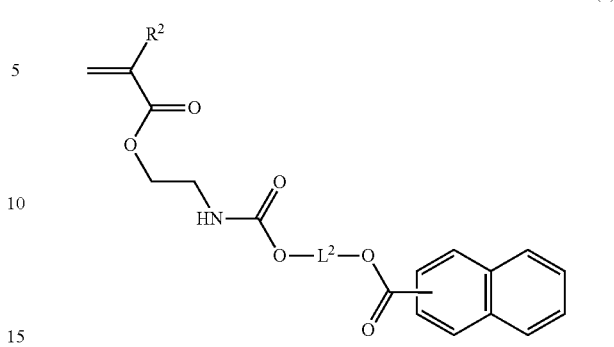

General Formula (4)

where, in General Formula (4), $R^2$ is a hydrogen atom or a methyl group and $L^2$ is an alkylene group having 2 or greater carbon atoms but 18 or less carbon atoms.

<5> The copolymer according to <4>,
wherein the compound represented by General Formula (3) is at least one of 6-acrylamidehexanoic acid and 3-acrylamidepropionic acid.

<6> The copolymer according to <4> or <5>,
wherein the compound represented by General Formula (4) is a polymer formed of naphthalene carboxylic acid hydroxyl alkyl ester and (meth)acryloyloxy alkyl isocyanate, where the naphthalene carboxylic acid hydroxyl alkyl ester is formed of a naphthoic acid compound and a diol compound.

<7> The copolymer according to any one of <1> to <6>,
wherein $R^1$ in General Formula (1) is a hydrogen atom.

<8> The copolymer according to any one of <1> to <7>,
wherein X in General Formula (1) is a tetraethyl ammonium ion.

<9> The copolymer according to any one of <1> to <8>,
wherein a number average molecular weight of the copolymer is 500 or greater but 10,000 or less.

<10> The copolymer according to any one of <1> to <9>,
wherein a weight average molecular weight of the copolymer is 1,500 or greater but 30,000 or less.

<11> An ink including:
water;
a coloring material; and
a copolymer,
wherein the copolymer is the copolymer according to any one of <1> to <10>.

<12> The ink according to <11>,
wherein the coloring material is a pigment.

<13> The ink according to <11> or <12>, further including:
a water-soluble organic solvent, or a surfactant, or both.

<14> The ink according to <13>,
wherein the water-soluble organic solvent includes 2-ethyl-1,3-hexanediol, or 2,2,4-trimethyl-1,3-pentanediol, or both.

<15> The ink according to <13> or <14>,
wherein the surfactant is a fluorine-based surfactant.

<16> The ink according to any one of <11> to <15>,
wherein a viscosity of the ink at 25° C. is 5 mPa·s or greater but 30 mPa·s or less.

<17> The ink according to any one of <11> to <16>,
wherein a surface tension of the ink at 25° C. is 35 mN/m or less.

<18> The ink according to any one of <12> to <17>,
wherein an amount of the pigment is 0.5% by mass or greater but 20% by mass or less.

<19> The ink according to any one of <12> to <17>, wherein an amount of the pigment is 1% by mass or greater but 10% by mass or less.

<20> An ink-stored container including:

the ink according to any one of <11> to <19>; and a container storing the ink.

The copolymer according to any one of <1> to <10>, the ink according to any one of <11> to <19>, and the ink-stored container according to <20> can solve the above-described various problems in the art and achieve the object of the present disclosure.

What is claimed is:

1. A copolymer comprising:
   a structural unit represented by General Formula (1) below; and
   a structural unit represented by General Formula (2) below,

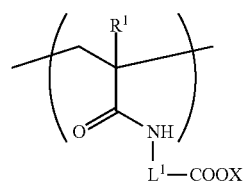

General Formula (1)

where, in General Formula (1), $R^1$ is a hydrogen atom or a methyl group, $L^1$ is an alkylene group having 2 or greater carbon atoms but 5 or less carbon atoms, and X is a hydrogen atom or a cation,

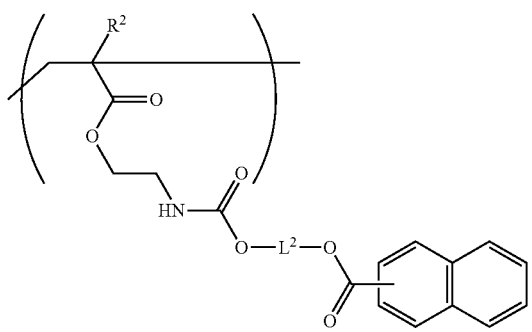

General Formula (2)

where, in General Formula (2), $R^2$ is a hydrogen atom or a methyl group and $L^2$ is an alkylene group having 2 or greater carbon atoms but 18 or less carbon atoms.

2. The copolymer according to claim 1,
   wherein a molar ratio of the structural unit represented by General Formula (1) to the structural unit represented by General Formula (2) (the structural unit represented by General Formula (1):the structural unit represented by General Formula (2)) is from 0.5:1 through 3:1.

3. The copolymer according to claim 1,
   wherein, in the structural unit represented by General Formula (2), $L^2$ is an alkylene group having 2 or greater carbon atoms but 12 or less carbon atoms.

4. The copolymer according to claim 1,
   wherein the copolymer is formed by polymerizing a compound represented by General Formula (3) and a compound represented by General Formula (4),

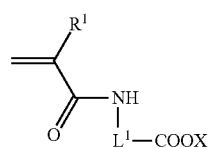

General Formula (3)

where, in General Formula (3), $R^1$ is a hydrogen atom or a methyl group, $L^1$ is an alkylene group having 2 or greater carbon atoms but 5 or less carbon atoms, and X is a hydrogen atom or a cation,

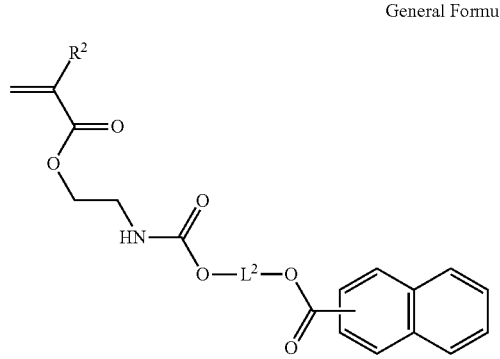

General Formula (4)

where, in General Formula (4), $R^2$ is a hydrogen atom or a methyl group and $L^2$ is an alkylene group having 2 or greater carbon atoms but 18 or less carbon atoms.

5. An ink comprising:
   water;
   a coloring material; and
   a copolymer,
   wherein the copolymer is a copolymer including:
   a structural unit represented by General Formula (1) below; and
   a structural unit represented by General Formula (2) below,

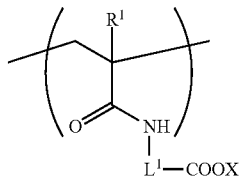

General Formula (1)

where, in General Formula (1), $R^1$ is a hydrogen atom or a methyl group, $L^1$ is an alkylene group having 2 or greater carbon atoms but 5 or less carbon atoms, and X is a hydrogen atom or a cation, General Formula (2)

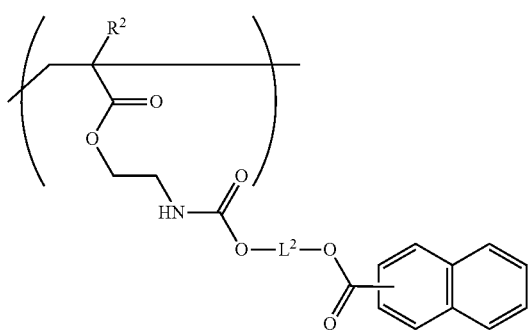

where, in General Formula (2), $R^2$ is a hydrogen atom or a methyl group and $L^2$ is an alkylene group having 2 or greater carbon atoms but 18 or less carbon atoms.

6. The ink according to claim 5, wherein the coloring material is a pigment.

7. The ink according to claim 5, further comprising: a water-soluble organic solvent, or a surfactant, or both.

8. An ink-stored container comprising:
an ink; and
a container storing the ink,
wherein the ink includes:
water;
a coloring material; and
a copolymer,
wherein the copolymer is a copolymer including:
a structural unit represented by General Formula (1) below; and
a structural unit represented by General Formula (2) below, General Formula (1)

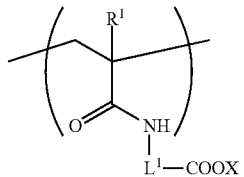

where, in General Formula (1), $R^1$ is a hydrogen atom or a methyl group, $L^1$ is an alkylene group having 2 or greater carbon atoms but 5 or less carbon atoms, and X is a hydrogen atom or a cation, General Formula (2)

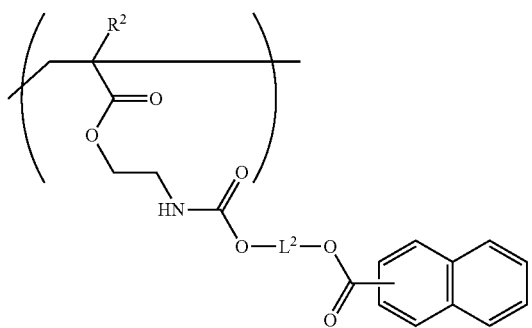

where, in General Formula (2), $R^2$ is a hydrogen atom or a methyl group and $L^2$ is an alkylene group having 2 or greater carbon atoms but 18 or less carbon atoms.

* * * * *